US012774009B2

(12) United States Patent
Jadhav et al.

(10) Patent No.: US 12,774,009 B2
(45) Date of Patent: Oct. 27, 2026

(54) USING LIDAR OBJECTNESS TO ADDRESS VEHICLE SLICING IN SUPERVISED DEPTH ESTIMATION

(71) Applicant: QUALCOMM Incorporated, San Diego, CA (US)

(72) Inventors: Sai Madhuraj Jadhav, San Diego, CA (US); Amin Ansari, Federal Way, WA (US); Yunxiao Shi, San Diego, CA (US); Avdhut Joshi, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 503 days.

(21) Appl. No.: 18/310,403

(22) Filed: May 1, 2023

(65) Prior Publication Data

US 2024/0367674 A1 Nov. 7, 2024

(51) Int. Cl.
*B60W 60/00* (2020.01)
*G06T 7/13* (2017.01)
*G06T 7/521* (2017.01)

(52) U.S. Cl.
CPC ............. *B60W 60/001* (2020.02); *G06T 7/13* (2017.01); *G06T 7/521* (2017.01);
(Continued)

(58) Field of Classification Search
CPC ......... B60W 60/001; B60W 2420/403; B60W 2420/408; B60W 2556/00; G06T 7/13;
(Continued)

(56) References Cited

U.S. PATENT DOCUMENTS 11,537,139 B2 * 12/2022 Rankawat ............ G05D 1/0088
12,229,712 B1 * 2/2025 Merchan .............. G06Q 10/047
(Continued)

FOREIGN PATENT DOCUMENTS

CN 111428859 A 7/2020
CN 111542860 A * 8/2020 ............ B60W 40/04
(Continued)

OTHER PUBLICATIONS

GITHUB: "Detectron2", Facebook Research, Accessed on Apr. 11, 2023, pp. 1-3.
(Continued)

*Primary Examiner* — Rachid Bendidi
*Assistant Examiner* — Joseph Anderson Yanoska
(74) *Attorney, Agent, or Firm* — Shumaker & Sieffert, P. A.

(57) ABSTRACT

Example systems and techniques are described for controlling operation of a vehicle and training a machine learning model for controlling operation of a vehicle. A system includes memory configured to store point cloud data associated with the vehicle and one or more processors communicatively coupled to the memory. The one or more processors are configured to determine a depth map indicative of distance of one or more objects to the vehicle and control operation of a vehicle based on the depth map. The depth map is based on executing a machine learning model, the machine learning model being trained with a slice loss function determined from training point cloud data having a respective depth that is greater than the average depth for a set of points of the point cloud data plus a threshold.

26 Claims, 12 Drawing Sheets

(52) U.S. Cl.
CPC . *B60W 2420/403* (2013.01); *B60W 2420/408* (2024.01); *B60W 2556/00* (2020.02); *G06T 2207/10028* (2013.01); *G06T 2207/20081* (2013.01); *G06T 2207/30252* (2013.01)

(58) Field of Classification Search
CPC ........... G06T 7/521; G06T 2207/10028; G06T 2207/20081; G06T 2207/30252; G06V 10/82; G06V 20/56
See application file for complete search history.

(56) References Cited

U.S. PATENT DOCUMENTS

| | | | | |
|---|---|---|---|---|
| 2018/0229724 | A1* | 8/2018 | Gutmann | B60W 10/04 |
| 2020/0160542 | A1* | 5/2020 | Kanzawa | G06T 7/337 |
| 2020/0238991 | A1* | 7/2020 | Aragon | G05B 13/027 |
| 2020/0301013 | A1* | 9/2020 | Banerjee | G01S 17/931 |
| 2021/0046861 | A1* | 2/2021 | Li | G06V 10/30 |
| 2021/0256718 | A1* | 8/2021 | Gangundi | G06V 10/82 |
| 2023/0023126 | A1 | 1/2023 | Ansari et al. | |
| 2023/0080638 | A1* | 3/2023 | Guizilini | G06T 7/80 348/180 |

FOREIGN PATENT DOCUMENTS

| | | | | | |
|---|---|---|---|---|---|
| CN | 113408584 | A | | 9/2021 | |
| CN | 113129370 | B | * | 8/2022 | G06N 3/08 |
| CN | 114972758 | A | * | 8/2022 | G06V 10/7753 |
| WO | WO-2021013793 | A1 | * | 1/2021 | G06F 18/214 |

OTHER PUBLICATIONS

International Search Report and Written Opinion—PCT/US2024/025226—ISA/EPO—Sep. 18, 2024 10 Pages.

* cited by examiner

USING LIDAR OBJECTNESS TO ADDRESS VEHICLE SLICING IN SUPERVISED DEPTH ESTIMATION

TECHNICAL FIELD

This disclosure relates to autonomous vehicles and vehicles including advanced driver-assistance systems (ADAS).

BACKGROUND

An autonomous driving vehicle is a vehicle that is configured to sense the environment around the vehicle, such as the existence and location of other objects, and operating without human control. An autonomous driving vehicle may include a LiDAR system or other sensor system for sensing point cloud data indicative of the existence and location of other objects around the autonomous driving vehicle. In some examples, such an autonomous driving vehicle may be referred to as an ego vehicle. A vehicle having an ADAS is a vehicle that includes systems which may assist a driver in operating the vehicle, such as parking or driving the vehicle.

SUMMARY

The present disclosure generally relates to the use of partial-supervision machine learning models for autonomous driving and/or assisted driving (e.g., ADAS) applications. For example, this disclosure describes techniques for the use of a trained machine learning model in the operation of a vehicle, such as an ego vehicle, where the training of the machine learning model includes the determining and application of a slice loss to certain point cloud points of LiDAR data to reduce, minimize, or remove the effects of slices of incorrect depth data that is generated by the LiDAR system due to transparency of glass, such as windshield and/or windows of a neighboring vehicle.

Depth data, such as a depth map, generated based on LiDAR data may include points of a point cloud where the LiDAR pulse generated from a current vehicle travels through a window and/or windshield of a neighboring vehicle, rather than reflects off the window and/or windshield of the neighboring vehicle. Such points when eventually reflected and received by the LiDAR system of the current vehicle may indicate that the area of the window and/or windshield of the neighboring vehicle is much farther away from the LiDAR system than the area of the window and/or windshield of the neighboring vehicle actually is. Thus, the depth data may contain one or more "slices" of data that are erroneous. If an ego vehicle attempts to key off of an item in the area of such a slice, the distance of the neighboring vehicle may be determined erroneously which may lead to the ego vehicle not reacting to a neighboring vehicle in the manner intended. As such there may be a desire to take such slices into account when training the machine learning model.

In one example, this disclosure describes a system comprising: memory configured to store a depth map indicative of distance of one or more objects to a vehicle; and one or more processors communicatively coupled to the memory, the one or more processors being configured to: determine the depth map; and control operation of a vehicle based on the depth map, wherein the one or more processors are configured to determine the depth map based on executing a machine learning model, the machine learning model having been trained with a slice loss function determined from training point cloud data having a respective depth that is greater than the average depth for a set of points of the training point cloud data plus a threshold.

In another example, this disclosure describes a system comprising: memory configured to store the machine learning model; and one or more processors communicatively coupled to the memory, the one or more processors being configured to: determine a slice loss function from training point cloud data having a respective depth that is greater than the average depth for a set of points of the training point cloud data plus a threshold; and train the machine learning model with the slice loss function.

In another example, this disclosure describes a method comprising determining a depth map indicative of the distance to the vehicle; and controlling operation of a vehicle based on the depth map, wherein determining the depth map comprises executing a machine learning model, the machine learning model having been trained with a slice loss function determined from training point cloud data having a respective depth that is greater than the average depth for a set of points of the training point cloud data plus a threshold.

In another example, this disclosure describes a method comprising: determining a slice loss function from training point cloud data having a respective depth that is greater than the average depth for a set of points of the training point cloud data plus a threshold; and training the machine learning model with the slice loss function.

The details of one or more examples are set forth in the accompanying drawings and the description below. Other features, objects, and advantages will be apparent from the description, drawings, and claims.

DETAILED DESCRIPTION

An autonomous driving vehicle, such as an ego vehicle, or an assisted driving vehicle (e.g., a vehicle including an ADAS), may utilize a machine learning model for controlling operation of the vehicle. For example, the machine learning model may control or assist in controlling the acceleration, breaking, and/or navigation of the vehicle. Such operations may rely on depth data, such as a depth map, of the environment surrounding the vehicle. Such a depth map may be generated based on LiDAR data from a LiDAR system mounted on or in the vehicle. LiDAR operates by emitting pulses of light of which a LiDAR sensor senses a reflection. A LiDAR system may use the time between the emission of the pulse and the detection of the reflection of the pulse to determine a distance of the point at which the LiDAR pulse is reflected, for example, based on the speed of light. A collection of reflected pulses (which may be referred to as points) sensed by the LiDAR system may be referred to as a point cloud. By identifying specific objects represented within the point cloud, a vehicle may become aware of distances of such objects from the vehicle or the LiDAR system which may be useful in controlling operations of the vehicle so as to avoid neighboring vehicles.

As LiDAR relies on light being reflected off of a neighboring object, when a LiDAR pulse is transmitted towards glass, such as that of a windshield and/or window of a neighboring vehicle, the light may pass through the glass rather than being reflected back to a LiDAR sensor. As such, the distance associated with points generated by the LiDAR sensor in the area of the glass may be much farther from the vehicle than that area of the glass actually is. When determining a depth map based on the LiDAR data, this may lead to "slices" of depth data which are incorrect. As referred to herein, a slice may be an area of image data, for example, an area of image data associated with incorrect depth data. If the vehicle attempts to key in on a portion of a neighboring vehicle within such a slice for operational purposes, the vehicle may not determine the correct location of the neighboring vehicle which may cause the vehicle to operate in an unintended manner with respect to the neighboring vehicle.

This disclosure describes techniques and systems for addressing these slice errors in training data for a machine learning model which may be used when operating an autonomous vehicle and/or an assisted driving vehicle. By correcting such errors in the training data, a trained machine learning model may be better equipped to identify the actual positions of neighboring vehicles and thereby more safely and/or efficiently control operation of the vehicle.

Figure 1:
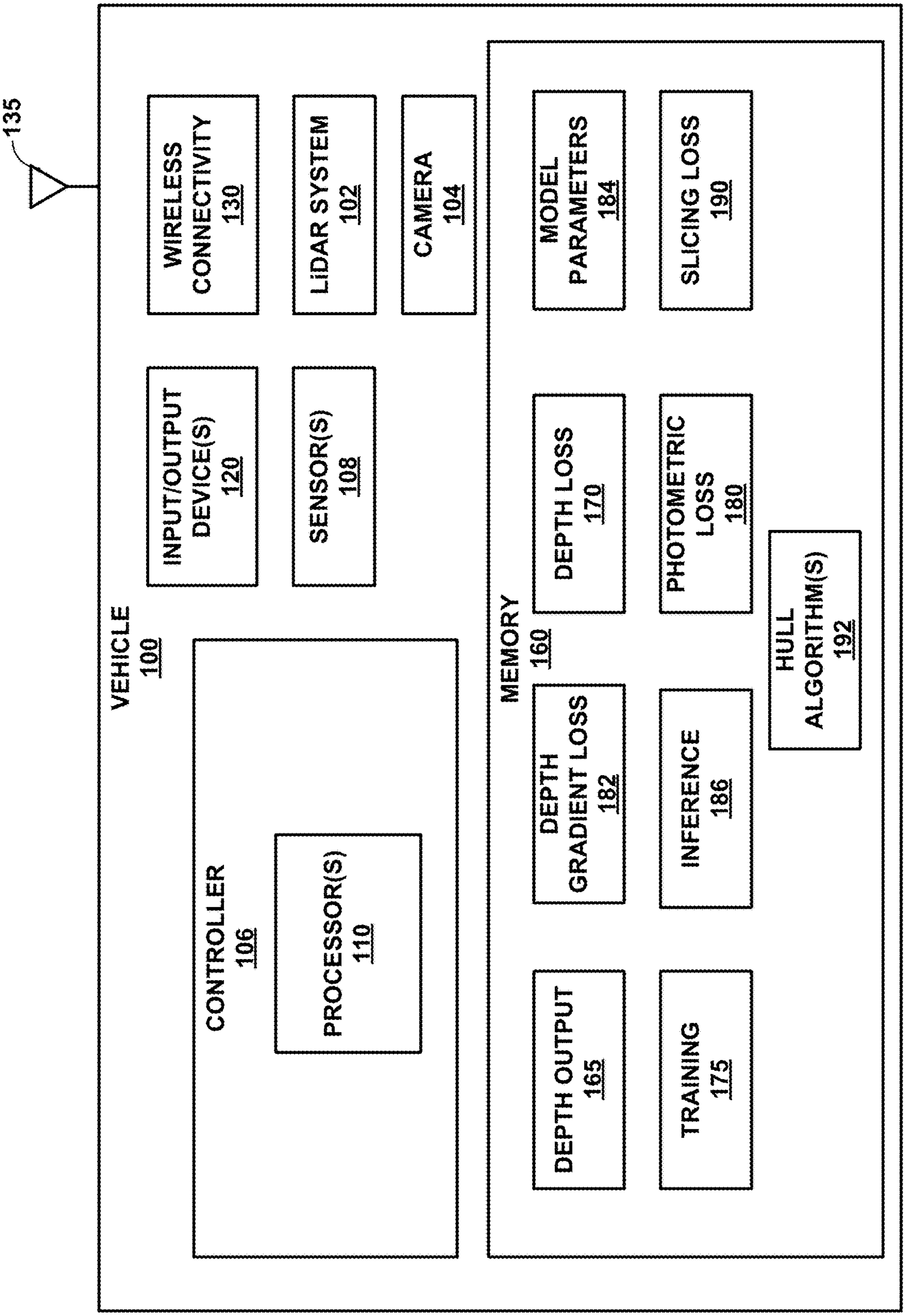
FIG. 1 is a block diagram illustrating an example vehicle according to one to more aspects of this disclosure.

FIG. 1 is a block diagram illustrating an example vehicle according to one to more aspects of this disclosure. Vehicle 100 may include an autonomous driving vehicle or an assisted driving vehicle (e.g., a vehicle having an ADAS). In some examples, vehicle 100 may be referred to as an ego vehicle.

Vehicle 100 may include LiDAR system 102, camera 104, controller 106, one or more sensor(s) 108, input/output device(s) 120, wireless connectivity component 130, and memory 160. LiDAR system 102 may include one or more light emitters and one or more light sensors. LiDAR system 102 may be deployed in or about vehicle 100. For example, LiDAR system 102 may be mounted on a roof of vehicle 100, in bumpers of vehicle 100, and/or in other locations of vehicle 100. LiDAR system 102 may be configured to emit light pulses and sense the light pulses reflected off of objects in the environment of vehicle 100. LiDAR system 102 (and/or processor(s) 110) may determine a distance to such objects based on the time between the emission of a light pulse and the sensing of the reflection of the light pulse. LiDAR system 102 may emit such pulses in a 360 degree field around vehicle 100 so as to detect objects within the 360 degree field, such as objects in front of, behind, or beside vehicle 100. While described herein as including LiDAR system 102, it should be understood that another distance or depth sensing system may be used in place of LiDAR system 102.

Camera 104 may include a dashcam or other camera. Camera 104 may be configured to capture video or image data in the environment around vehicle 100. In some examples, camera 104 may be a camera system including more than one camera sensor.

Dense (or sparse) depth estimation may be relatively important to a variety of applications, such as autonomous driving, assistive robotics, augmented reality, virtual reality scene composition, image editing, and/or the like. For example, in an autonomous driving scenario, depth estimation may provide an estimated distance from one vehicle (e.g., first vehicle) to another (e.g., second vehicle), which may be important to operational systems of the first vehicle, for existence, acceleration, braking, steering, etc.

Depth estimation may be implemented through leveraging any of a number of different principles, such as principles associated with cameras, such as camera 104. For example, calibrated stereo, multi-view stereo, learning from monocular videos (e.g., Structure from Motion (SfM)), or the like, may be used for depth estimation. SfM is a range imaging technique that may be used to estimate 3D structures from a plurality of 2D images based on motion (e.g., motion of vehicle 100).

Monocular depth estimation is now explained. Monocular depth estimation has increased in popularity lately for various reasons. Stereo camera setups are relatively costly and may be relatively difficult to keep calibrated. Multi-view camera setups may suffer from a high baseline cost, synchronization issues, the existence of low overlapping regions, etc. However, monocular cameras are ubiquitous in certain industries, such as the auto industry. For example, monocular cameras can be used to collect data in the form of simple dashcams. In some examples, camera 104 includes a monocular camera.

However, inferring single-image depth using geometric principles alone may be problematic for monocular depth estimation. As such, it may be desirable to use machine learning monocular depth estimation.

Supervision in a monocular depth estimation machine learning model is now discussed. Learning from a monocular camera (e.g., camera 104) may be performed in a various manners, such as self-supervision, full-supervision, and partial-supervision. For example, with self-supervision, vehicle 100 may use a temporal axis to infer depth. In some examples, vehicle 100 may jointly learn depth and ego-motion using self-supervision. Ego-motion may be motion of vehicle 100. For example, vehicle 100 may leverage SfM principles to perform view synthesis as a (self) supervision signal. This may eliminate the need for a depth ground truth, which may not be easy to construct. The abundance of video data from camera 104 may make self-supervision an attractive option.

With full-supervision, vehicle 100 may learn a mapping from images to dense depth maps. However, it may be cost and time prohibitive to acquire real world high-quality depth annotations which may be required for full-supervision. With partial-supervision, vehicle 100 may rely mainly on self-supervision, while applying full-supervision to a relatively small subset of pixels. Such a system may help to resolve the issue of scale ambiguity in self-supervision systems. Further information relating to partial-supervision may be found in U.S. Patent Publication 2023/0023126 A1, published on Jan. 26, 2023, which is hereby incorporated by reference in its entirety.

Supervision may help with providing higher quality depth maps. LiDAR system 102 may be used to provide a sparse ground truth for depth estimation for vehicle 100. For example, LiDAR system 102 may be mounted on top of vehicle 100 to acquire a dense 3D point cloud of the surroundings of vehicle 100. Based on the height of vehicle 100, the LiDAR pulses generated and emitted by LiDAR system 102 mounted on top of vehicle 100 may pass through a window and/or windshield of a neighboring vehicle. Because of LiDAR pulses traversing through the window and/or windshield of the neighboring vehicle, the LiDAR pulses may not be reflected properly back to LiDAR system 102. Thus, the depth of the points in the region of the window and/or windshield may be incorrectly estimated, causing a depth map which has slices where the LiDAR sensor does not sense the window and/or the windshield as a surface of the neighboring vehicle. This problem of generating a depth map with slices is generally observed in most reasonably sized vehicles (e.g., sedans, trucks, SUVs) which are in adjacent lanes to vehicle 100.

Controller 106 may be an autonomous or assisted driving controller (e.g., an ADAS) configured to control operation of vehicle 100. For example, controller 106 may control acceleration, braking, and/or navigation of vehicle 100 through the environment surrounding vehicle 100. Controller 106 may include one or more processors, e.g., processor(s) 110. Processor(s) may include one or more central processing units (CPUs), such as single-core or multi-core CPUs, graphics processing units (GPUS), digital signal processor (DSPs), neural processing unit (NPUs), multimedia processing units, and/or the like. Instructions executed by processor(s) 110 may be loaded, for example, from memory 160 and may cause processor(s) 110 to perform the operations attributed to processor(s) in this disclosure. In some examples, one or more of processor(s) 110 may be based on an ARM or RISC-V instruction set.

An NPU is generally a specialized circuit configured for implementing all the necessary control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

Processor(s) 110 may be configured to accelerate the performance of common machine learning tasks, such as image classification, machine translation, object detection, and various other tasks. In some examples, a plurality of processor(s) 110 may be instantiated on a single chip, such as a system on a chip (SoC), while in other examples one or more of processor(s) 110 may be part of a dedicated machine learning accelerator device.

In some examples, one or more of processor(s) 110 may be optimized for training or inference, or in some cases configured to balance performance between both. For processor(s) 110 that are capable of performing both training and inference, the two tasks may still generally be performed independently.

In some examples, processor(s) 110 designed to accelerate training are generally configured to accelerate the optimization of new models, which is a highly compute-intensive operation that involves inputting an existing dataset (often labeled or tagged), iterating over the dataset, and then adjusting model parameters 184, such as weights and biases, in order to improve model performance. Generally, optimizing based on a wrong prediction involves propagating back through the layers of the model and determining gradients to reduce the prediction error. In some examples, some or all of the adjustment of model parameters 184 may be performed out side of vehicle 100, such is in a cloud computing environment.

In some examples, processor(s) 110 designed to accelerate inference are generally configured to operate on complete models. Such processor(s) 110 may thus be configured to input a new piece of data and rapidly process the data through an already trained model to generate a model output (e.g., an inference).

In some examples, processor(s) 110 may operate on predictive models such as artificial neural networks (ANNs) or random forests (RFs). An ANN may include a hardware and/or a software component that includes a number of connected nodes (e.g., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge may be associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

In some aspects, wireless connectivity 130 component may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity 130 processing component is further connected to one or more antennas 135.

Processor(s) 110 may also include one or more sensor processing units associated with LiDAR system 102, camera 104, and/or sensor(s) 108. For example, processor(s) 110 may include one or more image signal processors associated with camera 104 and/or sensor(s) 108, and/or a navigation processor associated with sensor(s) 108, which may include satellite-based positioning system components (e.g., GPS or GLONASS) as well as inertial positioning system components.

Vehicle 100 may also include one or more input and/or output devices 120, such as screens, touch-sensitive surfaces (including touch-sensitive displays), physical buttons, speakers, microphones, and the like.

Vehicle 100 also includes memory 160, which is representative of one or more static and/or dynamic memories, such as a dynamic random access memory, a flash-based static memory, and the like. In this example, memory 160 includes computer-executable components, which may be executed by one or more of the aforementioned components of vehicle 100.

Examples of memory 160 include random access memory (RAM), read-only memory (ROM), or a hard disk. Examples of memory 160 include solid state memory and a hard disk drive. In some examples, memory 160 is used to store computer-readable, computer-executable software including instructions that, when executed, cause a processor to perform various functions described herein. In some cases, memory 160 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory 160 store information in the form of a logical state.

In particular, in this example, memory 160 includes model parameters 184 (e.g., weights, biases, and other machine learning model parameters 184). One or more of the depicted components, as well as others not depicted, may be configured to perform various aspects of the techniques described herein.

Generally, vehicle 100 and/or components thereof may be configured to perform the techniques described herein. Note that vehicle 100 of FIG. 1 is just one example, and in other examples, alternative vehicle 100 with more, fewer, and/or different components may be used.

In some aspects, camera 104 and/or sensor(s) 108 may include optical instruments (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device. In a camera, an image sensors may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

In some aspects, sensor(s) 108 may include direct depth sensing sensors, which may function to determine a depth of or distance to objects within the environment surrounding vehicle 100. Data from such dept sensing sensors may be used to supplement the depth map generation techniques discussed herein.

Input/output device(s) 120 (e.g., which may include an I/O controller) may manage input and output signals for vehicle 100. In some cases, input/output device(s) 120 may represent a physical connection or port to an external peripheral. In some cases, input/output device(s) 120 may utilize an operating system. In other cases, input/output device(s) 120 may represent or interact with a modem, a keyboard, a mouse, a touchscreen, or a similar device. In some cases, input/output device(s) 120 may be implemented as part of a processor (e.g., a processor of processor(s) 110). In some cases, a user may interact with a device via input/output device(s) 120 or via hardware components controlled by input/output device(s) 120.

In one aspect, memory 160 includes depth output component 165 (which may include a depth map), depth loss component 170, training component 175, photometric loss component 180, depth gradient loss component 182, model parameters 184, inference component 186, slicing loss component 190, and hull algorithm(s) 192.

Figure 2:
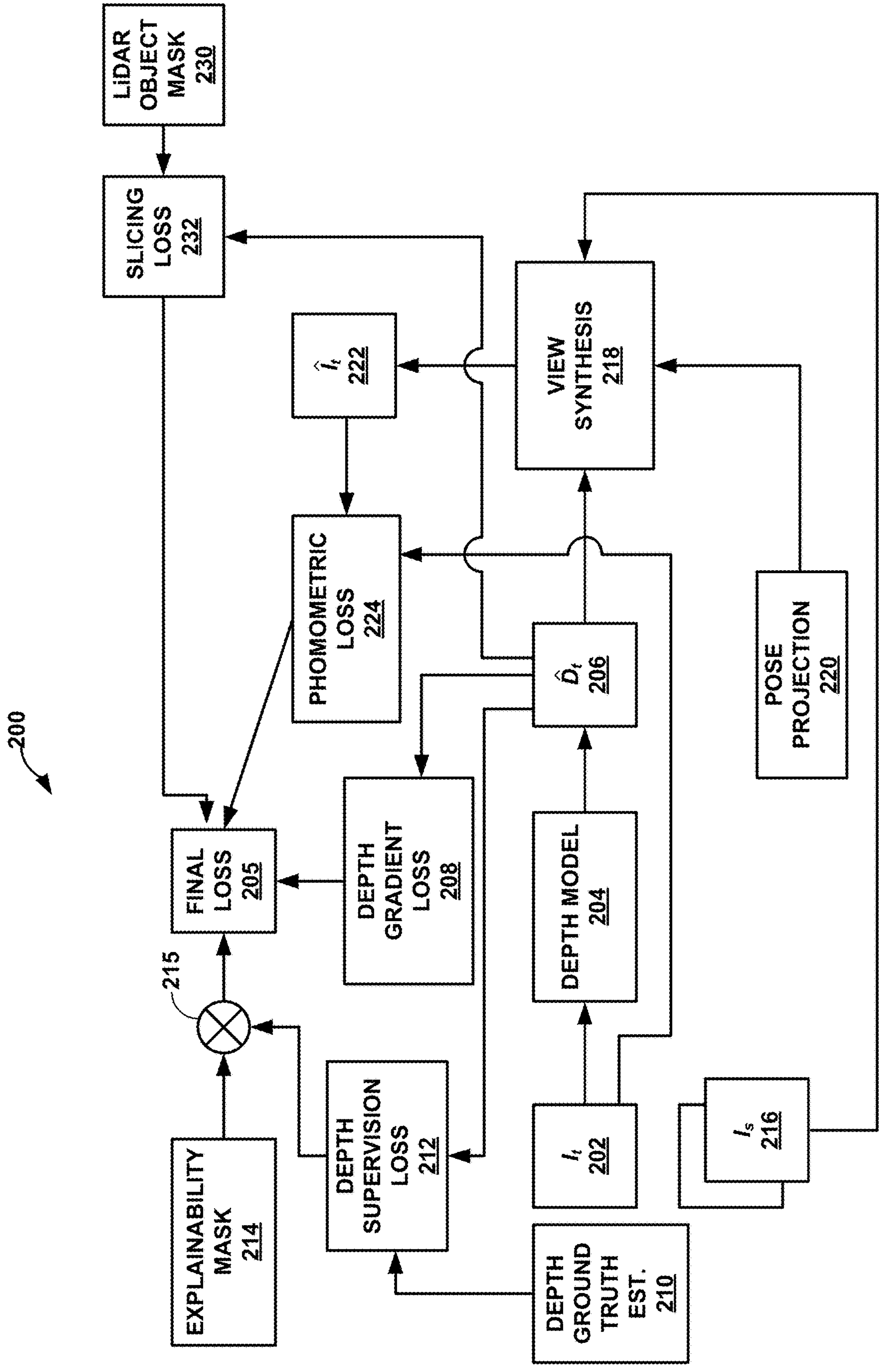
FIG. 2 is a conceptual diagram illustrating an example training architecture for partial supervision in self-supervised monocular depth estimation.

FIG. 2 is a conceptual diagram illustrating an example training architecture for partial supervision in self-supervised monocular depth estimation. Initially, a subject frame of image data at time t (It) 202 may be provided to a machine learning model 204, such as a neural network model (referred to in some examples as "DepthNet" or a "Depth Model"). Model 204 processes the image data and generates an estimated depth output (Dt) 206. Estimated depth output 206 may take different forms, such as a depth map indicating the estimated depth of each pixel directly, or a disparity map indicating the disparity between pixels. Depth and disparity are related and can be proportionally derived from each other.

Estimated depth output 206 is provided to a depth gradient loss function 208, which determines a loss based on, for example, the "smoothness" of the depth output. In one aspect, the smoothness of the depth output may be measured by the gradients (or average gradient) between adjacent pixels across the image. For example, an image of a simple scene having few objects may have a very smooth depth map, whereas an image of a complex scene with many objects may have a less smooth depth map, as the gradient between depths of adjacent pixels changes frequently and significantly to reflect the many objects.

Depth gradient loss function 208 provides a depth gradient loss component to final loss function 205. Though not depicted in FIG. 2, the depth gradient loss component may be associated with a hyperparameter (e.g., a weight) in final loss function 205, which may alter the influence of the depth gradient loss on final loss function 205.

Estimated depth output 206 is provided as an input to view synthesis function 218. View synthesis function 218 further takes as inputs one or more context frames (Is) 216 and a pose estimate from pose estimation function 220 and generates a reconstructed subject frame (It) 222. For example, view synthesis function 218 may perform an interpolation, such as bilinear interpolation, based on a pose projection from pose projection function 220 and using the depth output 206.

Context frames 216 may generally be frames near to the subject frame 202. For example, context frames 216 may be some number of frames or time steps on either size of subject frame 202, such as t+/−1 (adjacent frames), t+/−2 (non-adjacent frames), or the like. Though these examples are symmetric about subject frame 202, context frames 216 could be non-symmetrically located, such as t−1 and t+3.

Pose estimation function 220 is generally configured to perform pose estimation, which may include determining a projection from one frame to another.

Reconstructed subject frame 222 may be compared against subject frame 202 by a photometric loss function 224 to generate a photometric loss, which is another component of final loss function 205. As discussed above, though not depicted in the figure, the photometric loss component may be associated with a hyperparameter (e.g., a weight) in final loss function 205, which changes the influence of the photometric loss on final loss function 205.

Estimated depth output 206 is further provided to depth supervision loss function 212, which takes as a further input estimated depth ground truth values for subject frame 202, generated by depth ground truth estimate function 210, in order to generate a depth supervision loss. In some aspects, depth supervision loss function 212 only has or uses estimated depth ground truth values for a portion of the scene in subject frame 202, thus this step may be referred to as a “partial supervision”. In other words, while model 204 provides a depth output for each pixel in subject frame 202, depth ground truth estimate function 210 may only provide estimated ground truth values for a subset of the pixels in subject frame 202.

Depth ground truth estimate function 210 may generate estimated depth ground truth values by various different techniques. In one aspect, a sensor fusion function (or module) uses one or more sensors to directly sense depth information from a portion of a subject frame. Additional information regarding depth ground truth estimation function 210 and the various aspects of the training architecture of FIG. 2 may be found in U.S. Patent Publication 2023/0023126 A1, published on Jan. 26, 2023, the entire content of which is hereby incorporated by reference.

The depth supervision loss generated by depth supervision loss function 212 may be masked (using mask operation 215) based on an explainability mask provided by explainability mask function 214. The purpose of the explainability mask is to limit the impact of the depth supervision loss to those pixels in subject frame 202 that do not have explainable (e.g., estimable) depth.

For example, a pixel in subject frame 202 may be marked as “non-explainable” if the reprojection error for that pixel in the warped image (estimated subject frame 222) is higher than the value of the loss for the same pixel with respect to the original unwarped context frame 216. In this example, “warping” refers to the view synthesis operation performed by view synthesis function 218. In other words, if no associated pixel can be found with respect to original subject frame 202 for the given pixel in reconstructed subject frame 222, then the given pixel was probably globally non-static (or relatively static to the camera) in subject frame 202 and therefore cannot be reasonably explained.

The depth supervision loss generated by depth supervision loss function 212 and as modified/masked by the explainability mask produced by explainability mask function 214 is provided as another component to final loss function 205. As above, though not depicted in the figure, depth supervision loss component 212 may be associated with a hyperparameter (e.g., a weight) in final loss function 205, which changes the influence of the depth supervision loss on final loss function 205.

LiDAR object mask function 230 may provide an object mask, for example on a camera frame. The object mask may identify different objects within the camera frame, such as neighboring or nearby vehicles, through the use of gray scale masks with each different object having a gray scale mask of a different gray scale value.

Slicing loss function 232 may apply a slicing loss (e.g., of slicing loss component 190) to certain points contained within the object mask. The slicing loss may be applied to points in each gray scale mask of the object mask where the points have a distance associated with them that is greater than the average distance for points within their particular gray scale mask plus a threshold. For example, if the average distance for points in a particular gray scale mask is 4 meters and the threshold is 1 meter, then the slicing loss may be applied to points within that particular gray scale mask having a distance of at least 5 meters (4 meters plus 1 meter). The amount of slicing loss that is applied may be determined as described later in this disclosure. The slicing loss may be uniform for a particular batch of camera frames used for training the machine learning model. In this manner, size of a particular slice does not overly affect slicing loss function 232.

In an aspect, the final or total (multi-component) loss generated by final loss function 205 (which may be generated based a depth gradient loss generated by a depth gradient loss function 208, a (masked) depth supervision loss generated by depth supervision loss function 212, a photometric loss generated by photometric loss function 224, and/or a slicing loss function 232) is used to update or refine depth model 204. For example, using gradient descent and/or backpropagation, one or more parameters of depth model 204 may be refined or updated based on the total loss generated for a given subject frame 202.

In aspects, this updating may be performed independently and/or sequentially for a set of subject frames 202 (e.g., using stochastic gradient descent to sequentially update the parameters of the model 204 based on each subject frame 202) and/or in based on batches of subject frames 202 (e.g., using batch gradient descent).

Using architecture 200, model 204 thereby learns to generate improved and more accurate depth estimations 206. During runtime inferencing, trained model 204 may be used to generate depth output 206 for an input subject frame 202. This depth output 206 can then be used for a variety of purposes, such as autonomous driving and/or driving assist, as discussed above. In some aspects, at runtime, depth model 204 may be used without consideration or use of other aspects of training architecture 200, such as context frame(s) 216, view synthesis function 218, pose projection function 220, reconstructed subject frame 222, photometric loss function 224, depth gradient loss function 208, depth ground truth estimate function 210, depth supervision loss function 212, explainability mask function 214, and/or final loss function 205.

Figure 3:
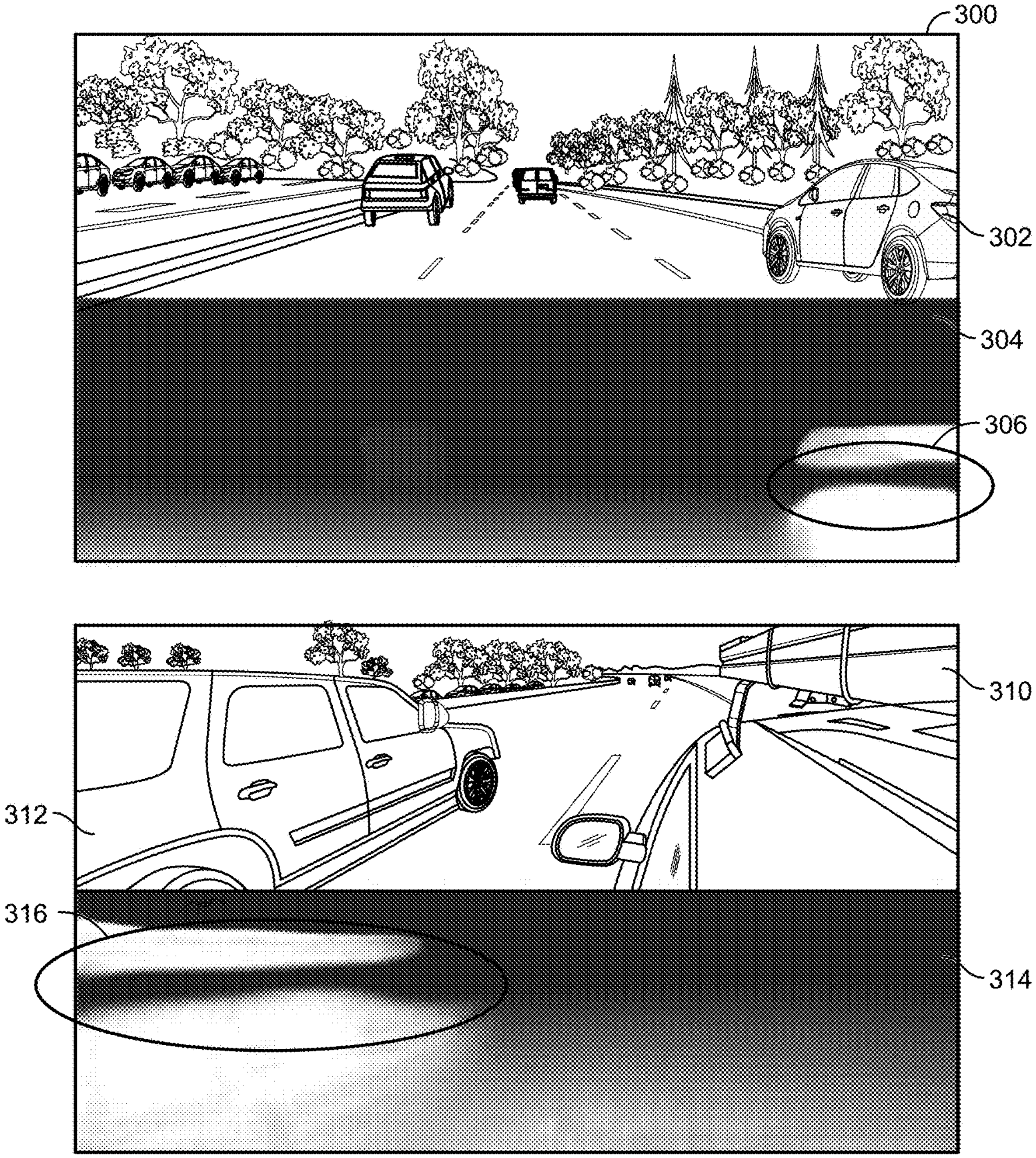
FIG. 3 is a conceptual diagram illustrating example camera frames and associated depth maps according to one or more aspect of this disclosure.

FIG. 3 is a conceptual diagram illustrating example camera frames and associated depth maps according to one or more aspect of this disclosure. In the example of FIG. 3, a frame 300 of image data may be captured by camera 104 of vehicle 100. An image of a vehicle near vehicle 100, vehicle 302, may be captured in frame 300. When processor(s) 110 (or LiDAR system 102) determines a depth map 304 based on captured information in frame 300, the depth map may show areas, referred to herein as slices, where LiDAR system 102 does not sense the window and/or the windshield as a surface of the neighboring vehicle. For example, slice 306 is shown in depth map 304 corresponding to areas of vehicle 302 where LiDAR system 102 did not sense the window and windshield areas of vehicle 302. Thus, in depth map 304, such areas appear to be relatively far from vehicle 100 even through they are relatively a same distance from vehicle 100 as the surrounding areas.

Similarly, frame 310 may include image data captured by camera 102 of vehicle 100. An image of another vehicle near vehicle 100, vehicle 312, may be captured in frame 310. When processor(s) 110 (or LiDAR system 102) determines a depth map 314 based on captured information in frame 310, the depth map contain slice 316, where LiDAR system 102 did not sense the window and/or the windshield as a surface of vehicle 312.

Figure 4:
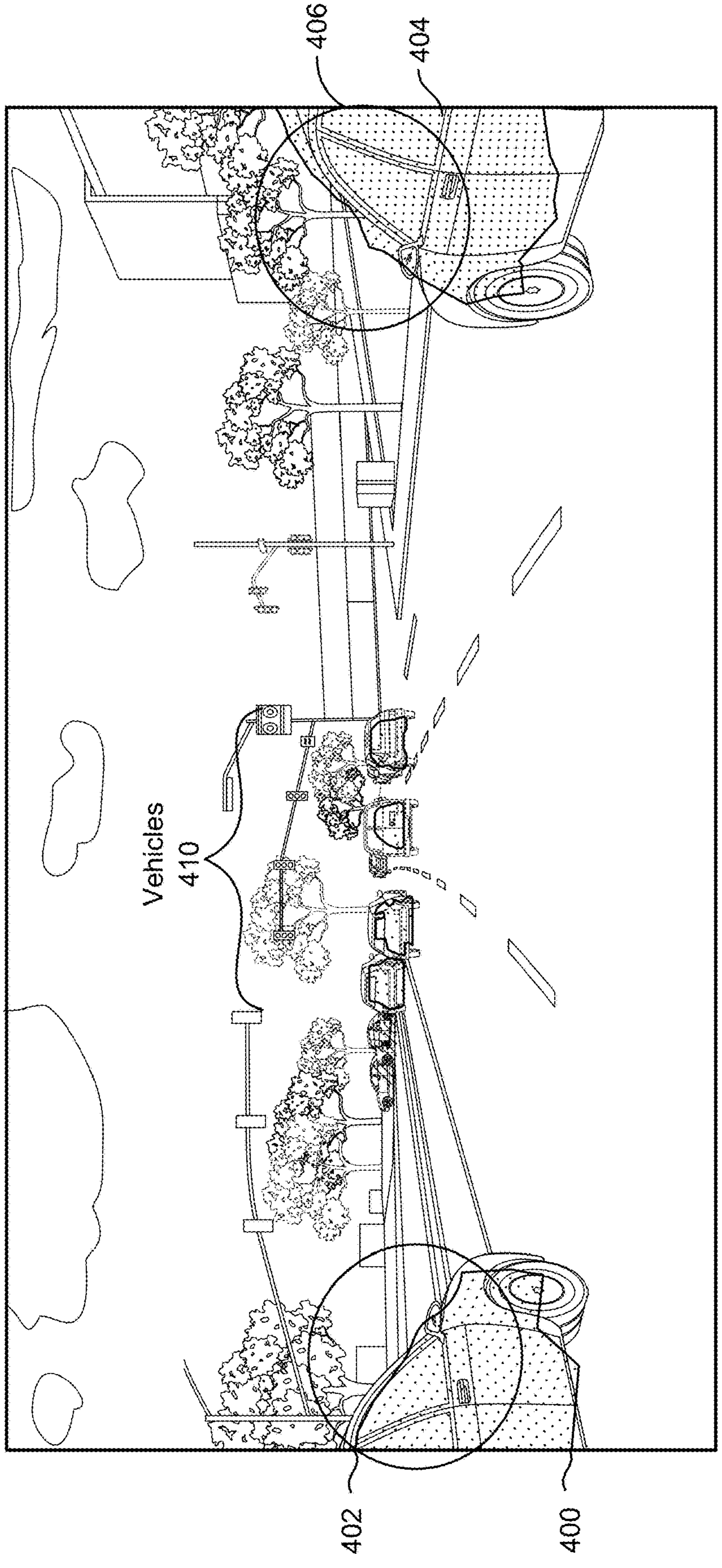
FIG. 4 is a conceptual diagram of a visualization of projecting three-dimensional (3D) LiDAR points in a two-dimensional (2D) camera frame with a thresholding distance of 20 meters in accordance with one or more aspects of this disclosure.

FIG. 4 is a conceptual diagram of a visualization of projecting 3D LiDAR points in a 2D camera frame with a thresholding distance of 20 meters in accordance with one or more aspects of this disclosure. A thresholding distance (e.g., 20 meters) may be utilized to remove objects that are relatively far away from vehicle 100 from consideration by controller 106 when controlling operation of vehicle 100.

Region 400 includes a plurality of point cloud points from LiDAR system 102 associated with a particular vehicle. Within region 400, encircled by circle 402, is an area of the windshield and right front window of the vehicle having missing points and relatively fewer points than other areas of region 400. Similarly, region 404 includes a plurality of point cloud points from LiDAR system 102 associated with another particular vehicle. Within region 404, encircled by circle 406, is an area of the windshield and left front window of the vehicle having missing points and relatively fewer points than other areas of region 404. Such points may be missing from areas 400 and 404 because even though points belong to the cars, processor(s) 110 or LiDAR system 102 may treat the distance associated with those points as being greater than 20 meters from vehicle 100 or being deeper than a depth dimension of a 3D bounding box because the LiDAR emitted light pulses pass through the windows and windshield at those points and are not reflected back to the LiDAR sensor of LiDAR system 102 or are reflected back off objects that are greater than 20 meters from vehicle 100 or outside of the 3D bounding box. Other points in the circled regions may be collected where LiDAR system 102 senses the window frame, for example.

Such missing points of point cloud data may result in slicing in depth maps where slices are not indicative of a true depth of a portion of a relatively nearby object. Thus, there may be a desire to address the issue of missing points of point cloud data due to LiDAR light pulses passing through windows and/or windshields of vehicles, such as vehicles in adjacent lanes to vehicle 100.

Missing points from vehicles 410 may be expected as LiDAR emitted light pulses may pass through the rear window and windshield of vehicles 410 in front of vehicle 100. Detailed depth information with respect to vehicles 410 may not be as important as detailed depth information for vehicles nearby vehicle 100. As such, any loss to be applied when attempting to address slicing, may be filtered so as not to be applied to objects at or above a certain distance from LiDAR system 102 or vehicle 100, for example 20 meters, 25 meters, or the like.

It may be desirable for a vehicle, such as vehicle 100, to distinguish between various objects, such as neighboring vehicles, which may be in the environment surrounding vehicle 100. There are various techniques which may be employed to distinguish between such objects.

One technique is panoptic segmentation, which is a combination of instance segmentation and semantic segmentation. For example, vehicle 100 may use panoptic segmentation to group pixels belonging to an instance of a neighboring vehicle and penalize the pixels of more than a certain depth, for example, pixels which have depth more than the median depth of that instance or more than the median depth of that instance plus a threshold, in an attempt to reduce or remove slicing in depth map data.

Another manner of attempting to address slicing in depth map data is LiDAR objectness. For example, vehicle 100 may obtain (e.g., generate or receive) instance labels based on LiDAR data and generate instance segmentation masks in 2D. Such instance labels may be based on 3D bounding box information. For example, vehicle 100 may track 3D point clouds over time and capture 3D bounding boxes over time. Vehicle 100 may determine which points are in which bounding boxes and label the points accordingly. For example, a point may belong to car1, car2, etc. The same or similar penalty of the pixels having a depth greater than a certain depth, for example, pixels which have depth more than the median depth of that instance or more than the median depth of that instance plus a threshold, may be used to improve the slicing problem.

In some examples, urban data collection may be utilized to generate training data having a relatively higher number of nearby (e.g., adjacent) vehicles than rural or highway driving. Such training data may be used to train model 204. Self-supervision (or partial-supervision) may not be helpful using highway generated data where most vehicles are moving. Adding data which includes more urban scenarios with parked cars may help train vehicle 100 to estimate depth of nearby vehicles more effectively in the case that vehicle 100 uses self-supervision as a part of the overall supervision scheme, such as a partial-supervision system.

In some examples, cross view training may be utilized. Cross view training may involve training making use of both labeled and unlabeled objects. Cross view consistency is a way to ensure that the depth of the pixels corresponding to a window and/or windshield of the neighboring vehicles are correct. This spatial cross view consistency may also be a form of self-supervision.

The use of LiDAR objectness data is now discussed. For example, vehicle 100 may acquire a 3D point cloud from LiDAR system 102. A 3D object detection and tracking solution may detect objects, generate 3D bounding boxes, and generate objectness information. Vehicle 100 may use this objectness information, for example, to further enhance the quality of depth estimation by alleviating or reducing the slicing problem.

For example, vehicle 100 may generate 2D labels in the camera view (e.g., a frame of camera data from camera 104) from the 3D objectness information from LiDAR system 102. The 3D bounding boxes may include instance information, which vehicle 100 may utilize. Vehicle 100 may perform a transformation from 3D to 2D using camera intrinsics and extrinsics. For example, camera intrinsics may include or be based on parameters such focal length, aperture, field-of-view, resolution, or the like, of camera 104. Camera extrinsics may relate to the location and/or orientation of camera 104 in space.

During a shape generation phase, vehicle 100 may use either a convex hull or a non-convex hull algorithm (e.g., of hull algorithm(s) 192) to find boundary points belonging to different vehicles. For example, AlphaShapes, as an example of non-convex techniques, may be used to generate masks for each camera frame.

These masks (e.g., covering polygons) may later be used during training by changing the loss to penalize points which belong to a vehicle instance, but have a depth above a certain threshold than the average depth of that instance (e.g., have a depth greater than the average depth of that instance plus a threshold). For example, if the threshold is 2 meter, the loss for points having a greater depth than 2 meters more than an average depth for points belonging to the vehicle instance, the penalty for such points may be determined as the depth of such points minus the average depth of points belonging to the vehicle instance.

Label generation using LiDAR annotations is now discussed. Vehicle 100 may generate labels using LiDAR annotations. In some examples, one or more persons may generate the LiDAR annotations for training data.

Figure 5:
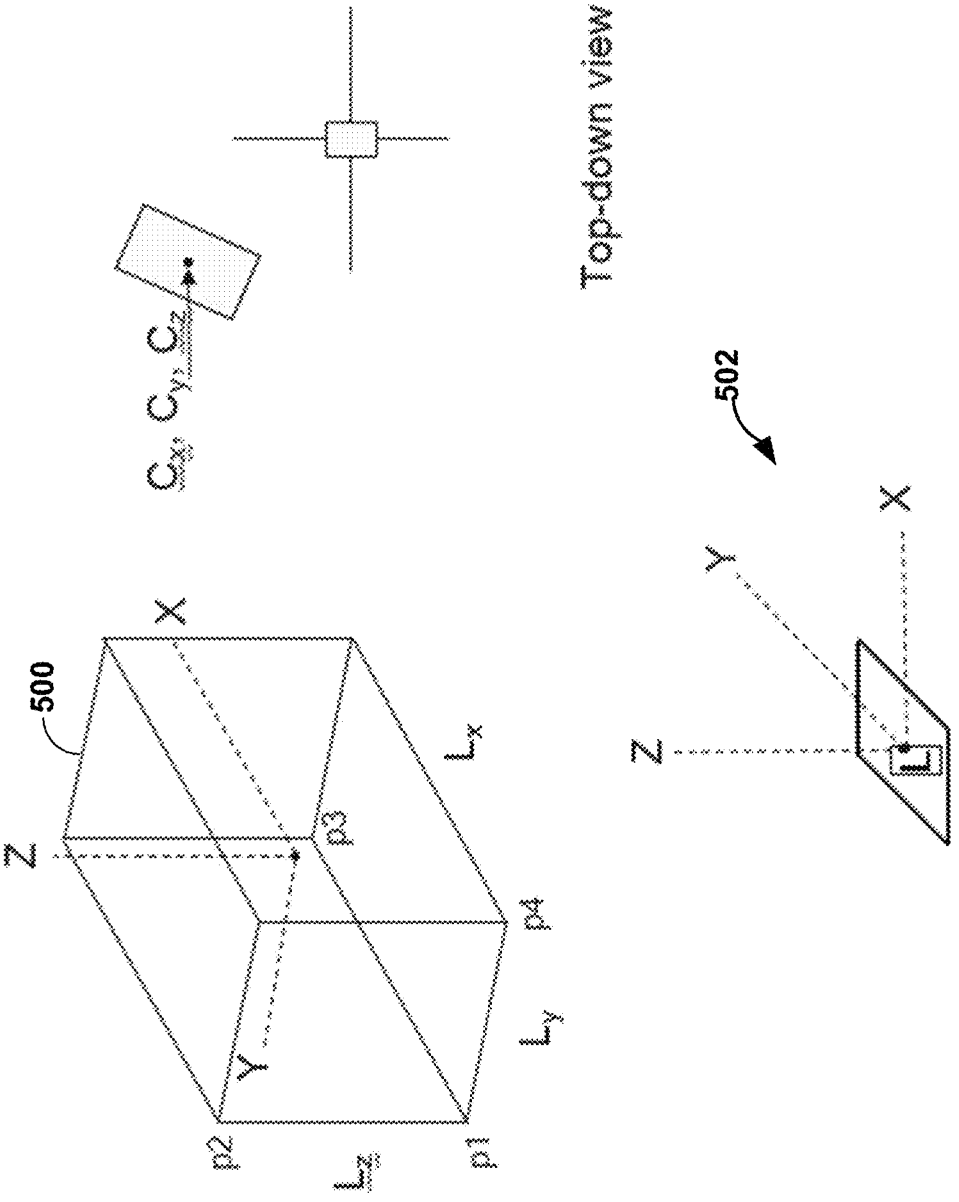
FIG. 5 is a conceptual diagram illustrating example bounding box techniques according to one or more aspects of this disclosure.

FIG. 5 is a conceptual diagram illustrating example bounding box techniques according to one or more aspects of this disclosure. For example, LiDAR annotations, which may include 3D bounding box locations and dimensions of all LiDAR objects for all timestamps, may be acquired. Vehicle 100 may generate a bounding box 500 using lengths $L_x$, $L_y$, $L_z$ at the center of the LiDAR axes 502. For example, bounding box 500 may include an object within the point cloud data. A position $C_x$, $C_y$, $C_z$ may be defined as the center point of bounding box 500. The center point of bounding box 500 may be equidistant from each x axis edge, equidistant from each y axis edge, and equidistant from each z axis edge. There may be rotation data associated with LiDAR 102 as well, for example, due to motion of LiDAR system 102 and/or vehicle 100.

Vehicle 100 may generate a transformation matrix T using $C_x$, $C_y$, $C_z$ as t and the rotation matrix values as R:

$$T = \begin{bmatrix} R & t \\ 0 & 1 \end{bmatrix}$$

Vehicle 100 may apply the transformation matrix T to bounding box 500 coordinates to position the corners of bounding box 500 in the LiDAR frame. Vehicle 100 may iterate through all the points in the LiDAR point clouds to determine if any point lies inside any of the boxes in the frame:

$$u = p1 - p3$$

$$v = p1 - p4$$

-continued $$w = p1 - p2$$

$$x = p1 - \text{point}$$

The point is inside the box if:

$$0 < x.u < u.u$$

$$0 < x.v < v.v$$

$$0 < x.w < w.w$$

Figure 6A:
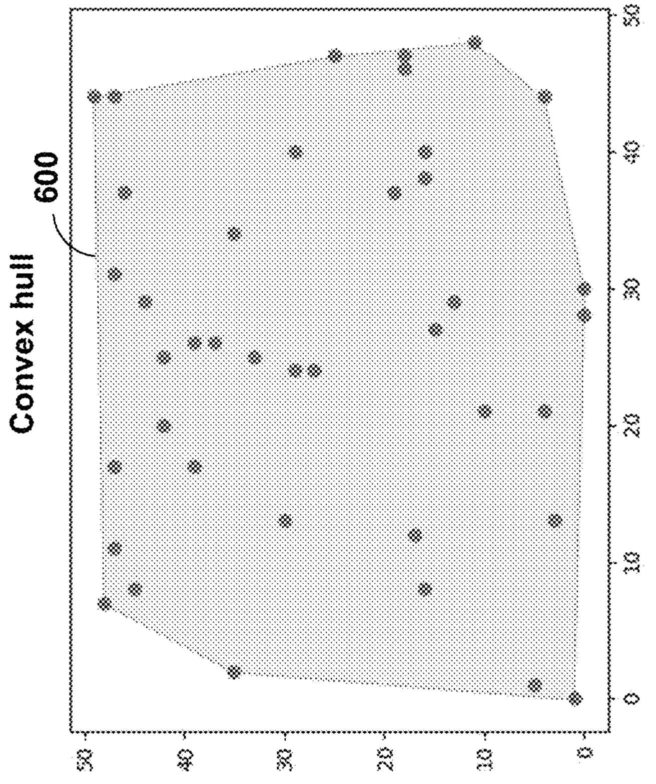
FIGS. 6A and 6B are conceptual diagrams illustrating an example convex hull shape and non-convex hull shape, respectively, according to one or more aspects of this disclosure.
Figure 6B:
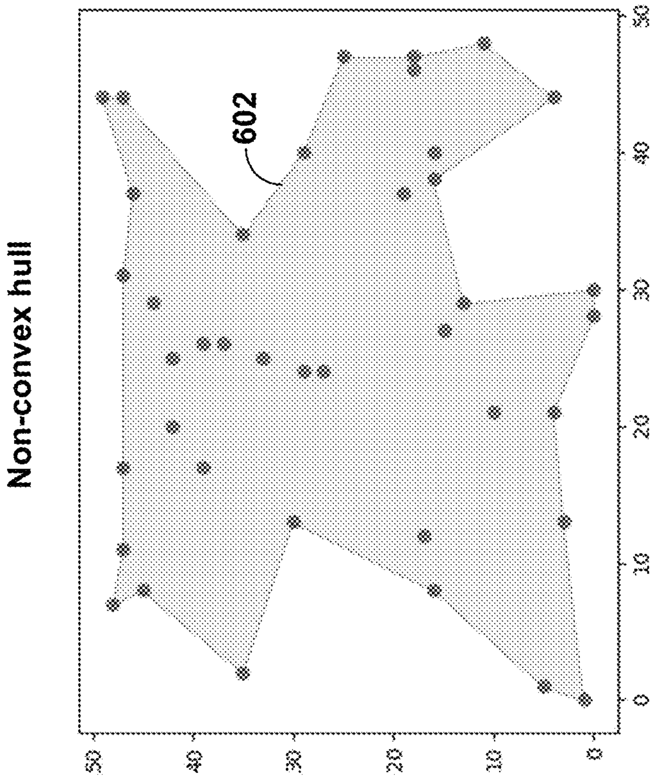

Shape generation is now discussed. FIGS. 6A and 6B are conceptual diagrams illustrating an example convex hull shape and non-convex hull shape, respectively, according to one or more aspects of this disclosure. As mentioned above, a convex hull or a non-convex hull approach may be used to generate a shape, for example, by processor(s) 110 executing hull algorithm(s) 192. For example, using a convex hull approach may be a simpler approach than using a non-convex hull approach. A convex hull may be considered a simplified case of a non-convex hull. A convex hull 600 may be a shape resembling what may be seen if one were to wrap a rubber band around pegs at all the data points of a set of point cloud points as shown in FIG. 6A.

Using a non-convex hull may be considered a more general approach. An AlphaShapes technique may be used to determine or generate a non-convex hull. For example, AlphaShapes techniques are often used to generalize bounding polygons containing sets of points. For example, an alpha parameter may be defined as a value a, such that an edge of a disk of radius 1/a can be drawn between any two edge members of a set of points and still contain all the points. An example non-convex hull 602 is shown in FIG. 6B. As can be seen, non-convex hull 602 more closely follows the contours of the exterior points of the point cloud data than convex hull 600.

Figure 7A:
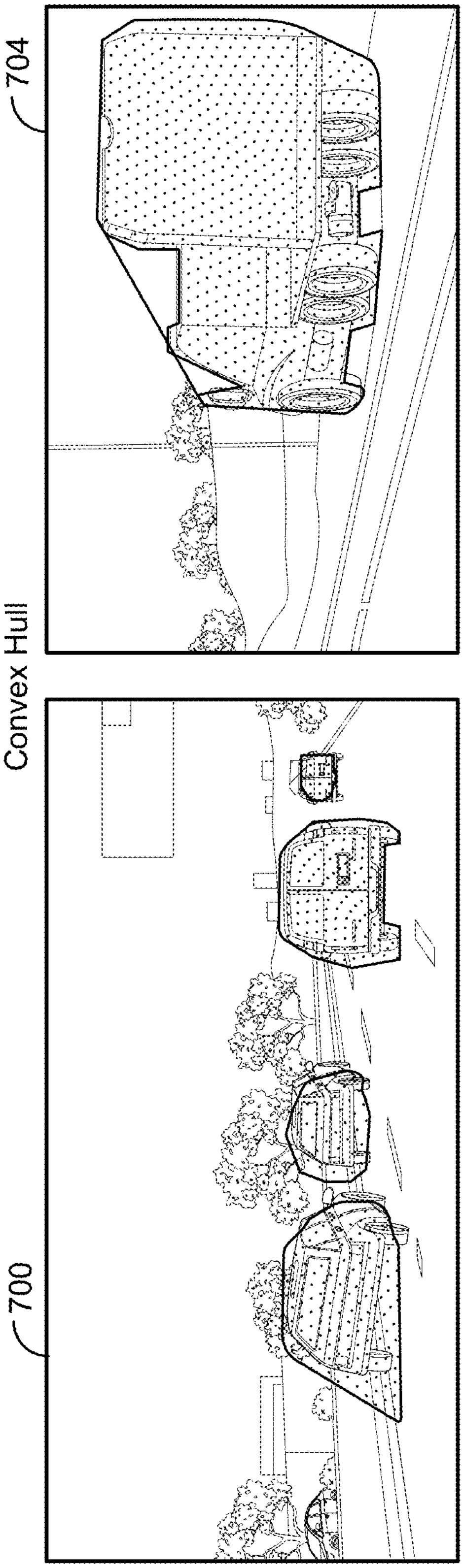
FIGS. 7A and 7B are conceptual diagrams illustrating example camera frames having points and convex hulls or non-convex hulls, respectively, overlayed on vehicles according to one or more aspects of this disclosure.
Figure 7B:
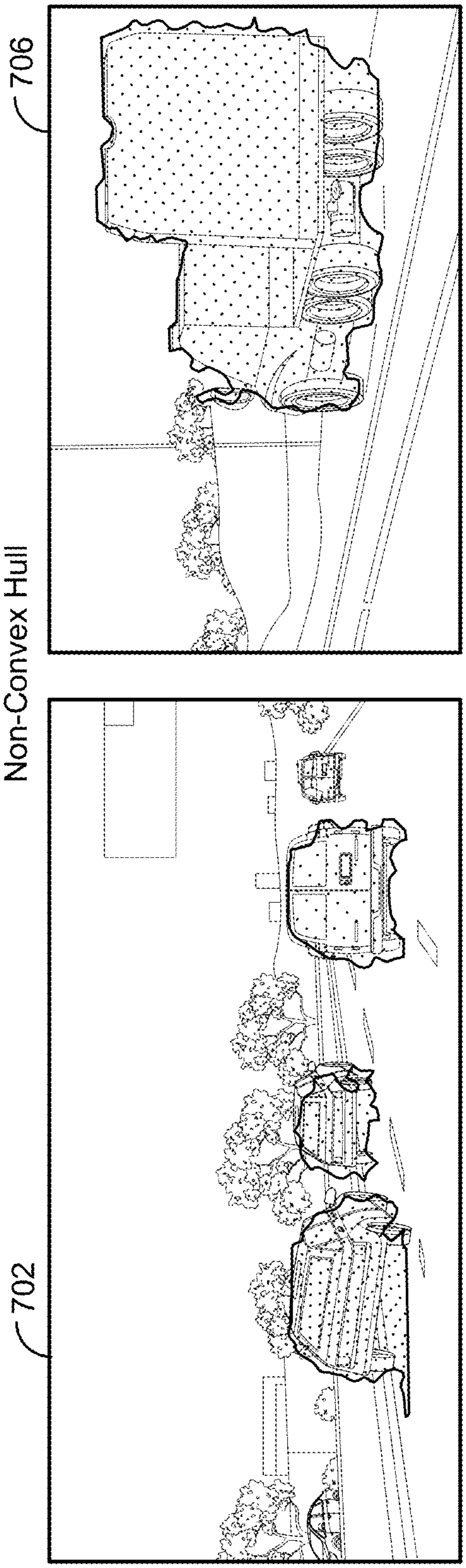

FIGS. 7A and 7B are conceptual diagrams illustrating example camera frames having points and convex hulls or non-convex hulls, respectively, overlayed on vehicles according to one or more aspects of this disclosure.

In frame 700, which includes the same image data as frame 702, points and convex hulls associated therewith are overlaid on the vehicles within frame 700, while in frame 702, the points and non-convex hulls associated therewith are overlaid on the vehicles. For example, looking at the left most vehicle, it may be seen that the convex hull overlaid on that vehicle is less of a precise fit to the vehicle than the non-convex hull overlaid on the left most vehicle.

Similarly, frame 704, which includes the same image data as frame 706, a convex hull is overlaid on the vehicle within frame 704, while in frame 706, a non-convex hull is overlaid on the vehicle. For example, it may be seen that the convex hull overlaid on the vehicle is less of a precise fit than the non-convex hull overlaid on the vehicle.

Figure 8:
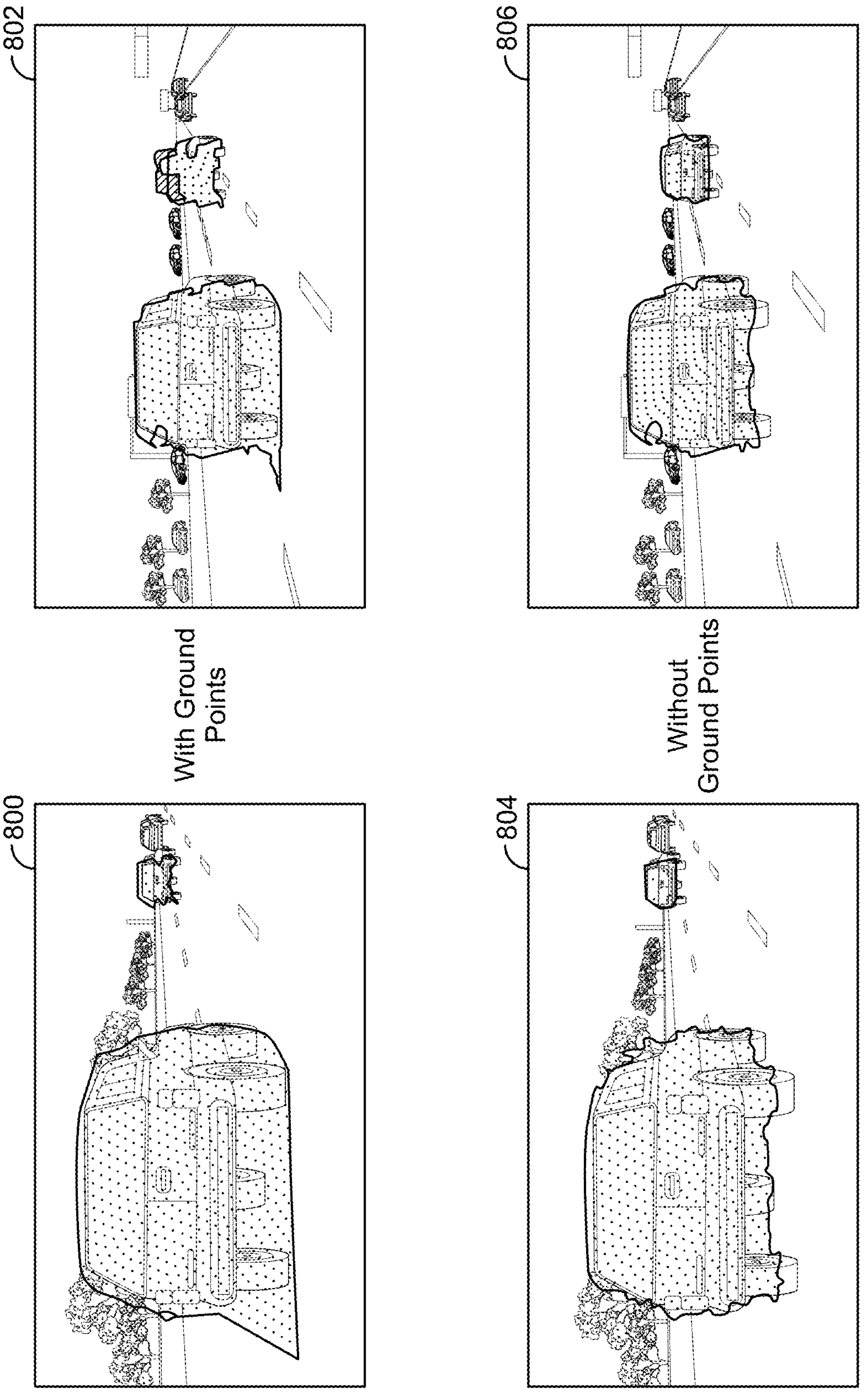
FIG. 8 is a conceptual diagram illustrating example 2D projections of applications of bounding boxes to vehicles and 2D projection of applications of bounding boxes having raised lower boundaries to vehicles according to one or more aspects of this disclosure.

FIG. 8 is a conceptual diagram illustrating example 2D projections of applications of bounding boxes to vehicles and 2D projection of applications of bounding boxes having raised lower boundaries to vehicles according to one or more aspects of this disclosure. Sometimes, 3D LiDAR bounding boxes may include points belonging to or associated with the ground, such as roads. Because the use of LiDAR objectness masks in this disclosure is primarily for an area where LiDAR pulses pass through a window and/or windshield of a vehicle, such ground points may not be needed. As such, a vehicle 100 may lift a 3D bounding box above the ground to avoid acquiring or including points which do not belong to vehicles, for example, prior to determining a 2D projection of the bounding box and points associated therewith. For example, lifting a bounding box by 0.2 m may roughly map to the radius of a 16-inch wheel.

In frame 800, a vehicle is shown with a 2D projection of a bounding box and points associated therewith. As can be seen, the 2D projection includes several ground points. A 2D projection of a bounding box having a lower boundary raised, and the points associated therewith, is shown applied to the same vehicle in frame 804. As can be seen, most or all of the ground points are no longer within the 2D projection in frame 804. Similarly, frame 802 shows vehicles with 2D projections of bounding boxes that include several ground points. When the lower boundary of these bounding boxes is raised, most or all of such ground points are no longer within the 2D projections, as shown in frame 806. For example, referring back to FIG. 5, vehicle 100 may raise the lower plane (of p1, p3, p4) by 0.2 m to avoid including ground points prior to determining 2D projections.

Alpha values for determining a non-convex hull are now discussed. It may be difficult to choose one alpha value for all possible different shapes of vehicles around vehicle 100. Vehicle 100 may use an optimization algorithm to calculate the best suitable alpha value for a given shape. However, this use of an optimization algorithm may be prohibitively slow and not practical.

Alternatively, vehicle 100 may use an average of optimal alpha values for some frames. For example, in a given dataset, an average optimal alpha value may be a=0.157, which may be a best alpha value for most shapes in the datasets. However, such an alpha value may not work well for vehicles relatively close to vehicle 100, with dispersed points.

In some examples, vehicle 100 may use an alpha value of a=0.157 as a first option. If the first option does not work well (e.g., returns an error), vehicle 100 may use a different alpha value, such as 0.02, which may work for vehicles that do not work well with the first option (e.g., 0.157). The use of these 2 values may cover most shapes in the datasets, without causing a much of a negative effect.

Mask generation is now discussed. Vehicle 100 may acquire 3D LiDAR points as an input. Such LiDAR points may be annotated. Such annotations may identify a given point as being part of an object such as a vehicle. Such annotations may include bounding boxes defining such an object. Vehicle 100 may generate instance labels using LiDAR annotations. Vehicle 100 may transform the 3D LiDAR points to 2D points in a camera frame using camera intrinsics and LiDAR to camera extrinsics (e.g., extrinsics of camera 104 in relation to LiDAR system 102). Vehicle 100 may filter points which belong to objects that are within a certain distance away from vehicle 100, for example, within 0-25 meters away from vehicle 100 as objects further away from vehicle 100 than 25 meters may have little effect on the navigation of vehicle 100.

Figure 9A:
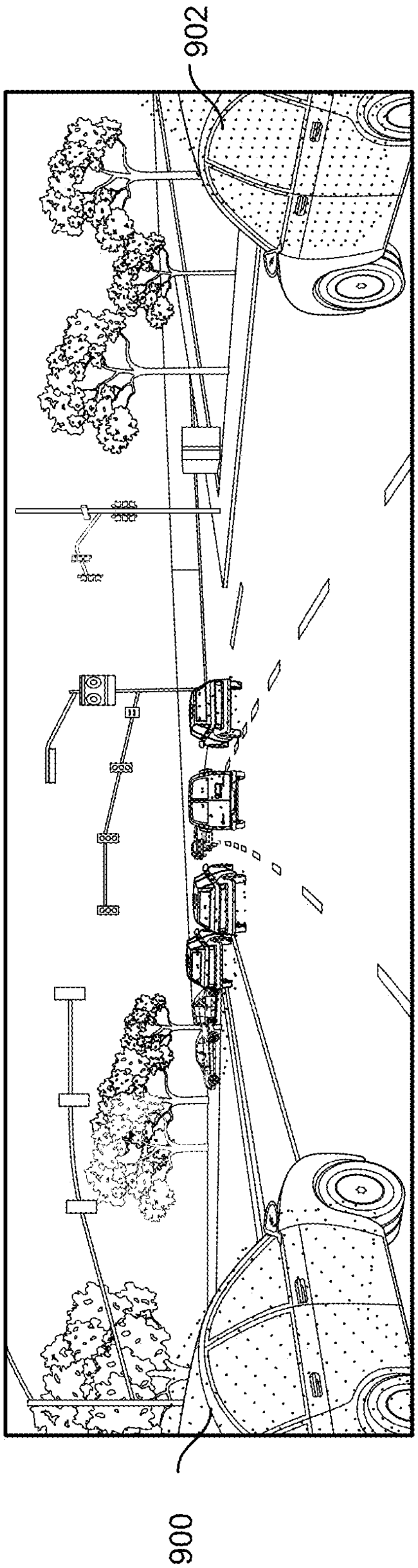
FIGS. 9A and 9B are conceptual diagrams illustrating example non-convex hulls and masks according to one or more aspects of this disclosure.
Figure 9B:
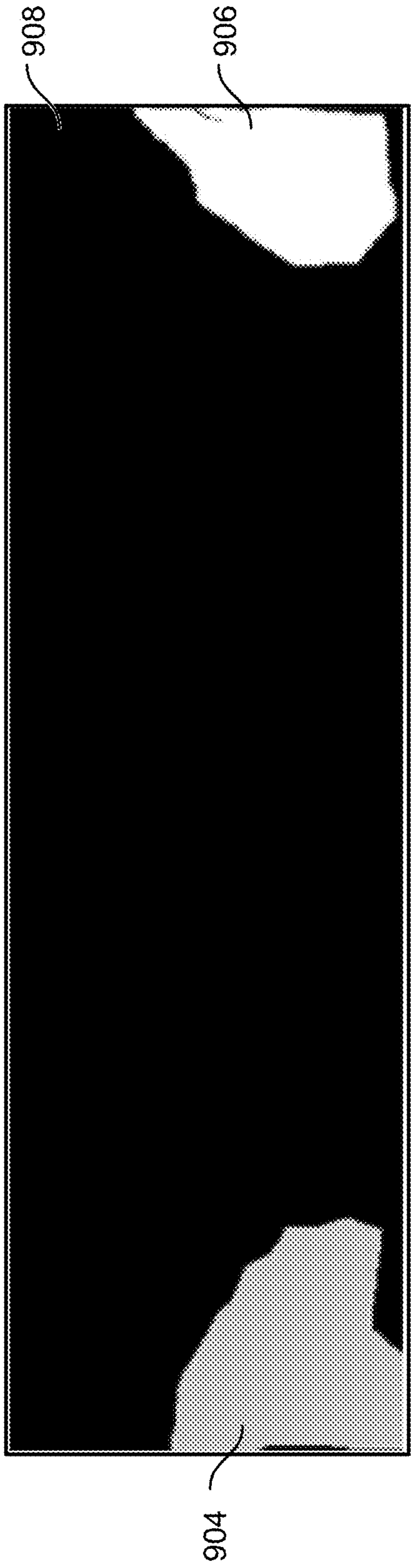

FIGS. 9A and 9B are conceptual diagrams illustrating example non-convex hulls and masks according to one or more aspects of this disclosure. Vehicle 100 may generate polygons for the above filtered points, for example, using a non-convex hull algorithm, such as AlphaShape, to generate polygons for filtered points. For example, vehicle 100 may generate polygons 900 and 902 using a non-convex hull algorithm. Vehicle 100 may generate a gray scale mask for these polygons, such that each object instance has a unique mask color in a mask for a given frame. For example, vehicle 100 may generate mask 908 which may include a gray scale mask 904 for the polygon 900 and gray scale mask 906 for polygon 902.

Figure 10:
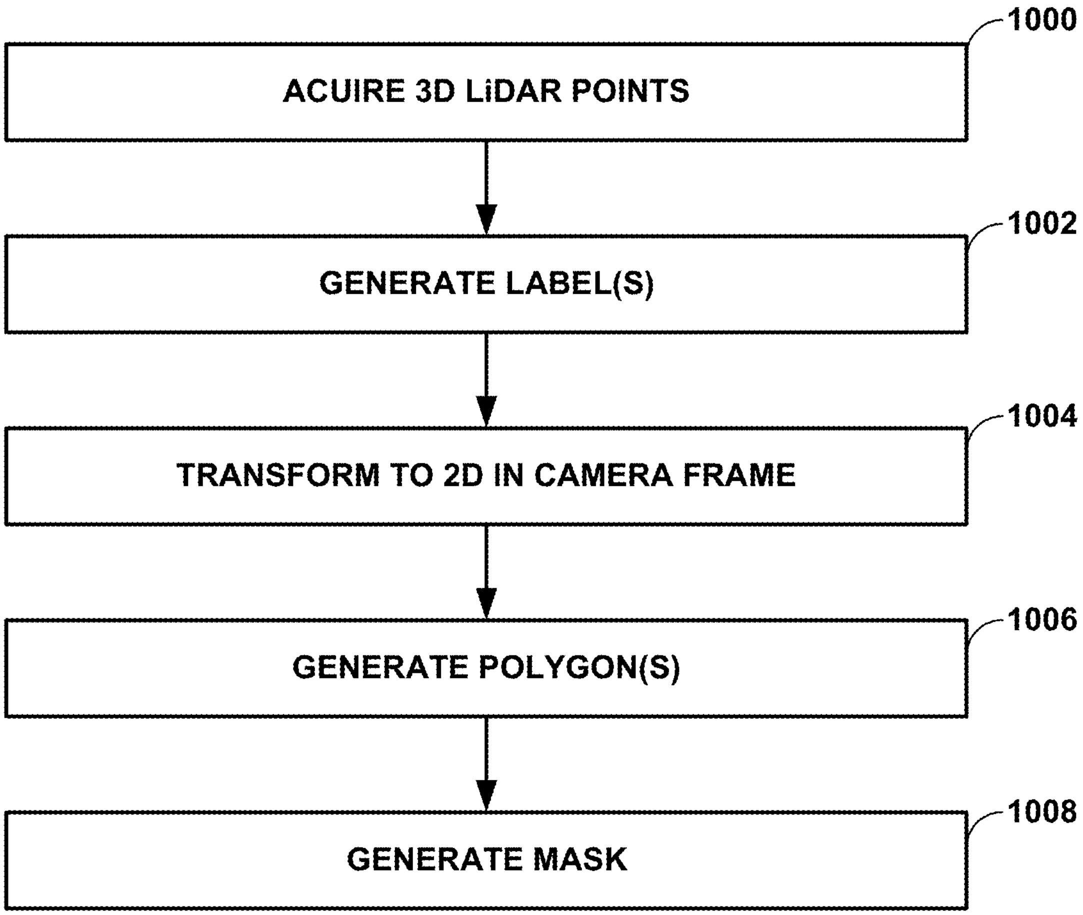
FIG. 10 is a flow diagram illustrating slicing loss techniques according to one or more aspects of this disclosure.

Incorporating the masks in the loss function is now discussed. FIG. 10 is a flow diagram illustrating slicing loss techniques according to one or more aspects of this disclosure. Vehicle 100 may acquire 3D LiDAR points (1000). For example, vehicle 100 may receive 3D LiDAR points from a LiDAR sensor or the like. Vehicle 100 may generate labels (1002). For example, vehicle 100 may generate one or more labels based on LiDAR annotations, such as bounding boxes, which may be received by vehicle 100.

Vehicle 100 may transform the 3D LiDAR points to a 2D camera frame representation (1004). For example, vehicle 100 may use intrinsics and extrinsics to transform the 3D LiDAR points to a 2D camera frame representation. Vehicle 100 may generate polygon(s) (1006). For example, vehicle 100 may generate a polygon, via a convex hull or non-convex hull algorithm for each vehicle represented in the 2D camera frame or for each vehicle within a given distance of vehicle 100.

Vehicle 100 may generate a mask for the 2D camera frame (1008). The mask may include gray scale masks associated with each polygon of the 2D camera frame. The mask may be used to determine slicing loss.

In some examples, a slicing loss ($\text{Loss}_{car\_slicing}$) for one batch of 2D camera frames may be calculated using the following formula:

$$\text{Loss}_{car\_slicing} = \frac{\text{scaling\_factor}}{Num_{Images} \times Num_{instances} \times Num_{points}} \times \sum_{img \in images} \sum_{inst \in instances} \sum_{pt \in points} \Big(\text{abs}\big(\text{depth\_predpt} - \text{median}\big(\forall_{(pt \in inst)}\ \text{depth\_pred}_{inst}^{pt}\big)\big) > \text{threshold}\Big)$$

where scaling_factor is a scaling factor, $\text{Num}_{Images}$ is a number of images in a batch of training images, $\text{Num}_{instances}$ is a number of instances in an image of the batch of training images, $\text{Num}_{points}$ is a number of points in an instance in the image, depth_predpt is a depth of a current point, depth_pred is a depth of a point, and threshold is the threshold.

For example, the slicing loss is basically calculated by taking an average of all the points which have depth values greater than a certain threshold more than the median depth for that object. This average is taken across all points belonging to the objects of interest across all objects in an image (e.g., a camera frame), and across all images within a batch of images.

Such averaging may be used so as to not overwhelm the final loss based on the amount of slicing happening in an image. It should be noted that the penalty may not be dependent on the number of points causing the slicing.

Figure 11:
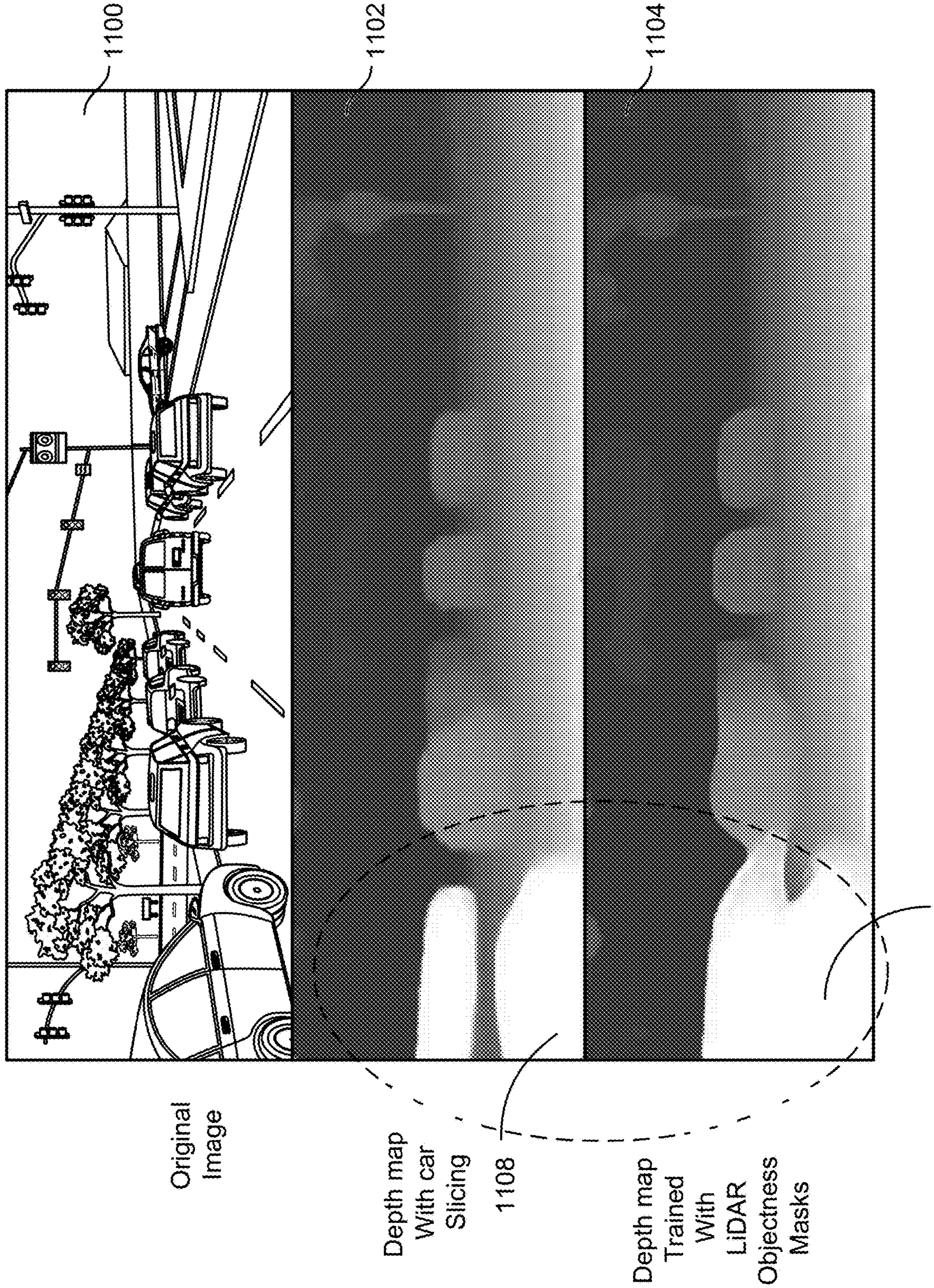
FIG. 11 is a conceptual diagram illustrating depth maps with and without the application of slicing loss according to one or more aspects of this disclosure.

FIG. 11 is a conceptual diagram illustrating depth maps with and without the application of slicing loss according to one or more aspects of this disclosure. Frame 1100 represents an image acquired by a camera, such as a dashcam. Depth map 1102 depicts a depth map associated with frame 1100 without applying a slicing loss function. As can be seen, slicing loss 1108 is shown in an area corresponding to the windows and/or windshield of the left most vehicle in frame 1100. Depth map 1104 depicts a depth map having a slicing loss function applied according to the techniques of this disclosure. As can be seen, area 1110 does not include nearly as much slicing loss as slicing loss 1108.

Figure 12:
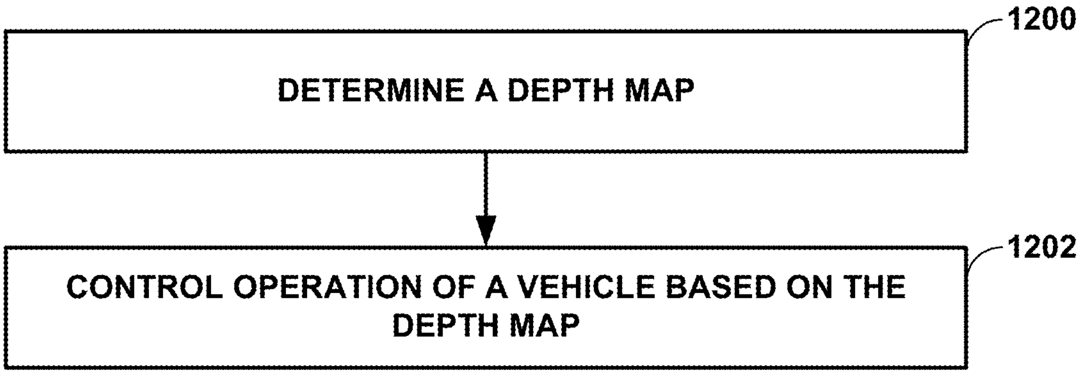
FIG. 12 is a flow diagram illustrating vehicle operation techniques according to one or more aspects of this disclosure.

FIG. 12 is a flow diagram illustrating vehicle operation techniques according to one or more aspects of this disclosure. Vehicle 100 may determine a depth data (1200). For example, vehicle 100 may determine a depth map indicative of distance of one or more objects to the vehicle. For example, vehicle 100 may determine the depth map based on executing a machine learning model (e.g., depth model 204), the machine learning model having been trained with a slice loss function determined from training point cloud data having a respective depth that is greater than the average depth for points of the training point cloud data plus a threshold.

Processor(s) 110 of vehicle 100 may control operation of vehicle 100 based on the depth map (1202). For example, processor(s) 110 may use the depth map to accelerate, break, and/or navigate vehicle 100 to avoid a collision with another vehicle.

In some examples, vehicle 100 may include camera 104 which may include a monocular camera configured to sense image data and vehicle 100 may determine the depth map based on executing depth model 204 on image data from camera 104. In some examples, depth model 204 has been further trained with at least one of depth gradient loss function 182, a depth supervision loss function 170, or a photometric loss function 180.

Figure 13:
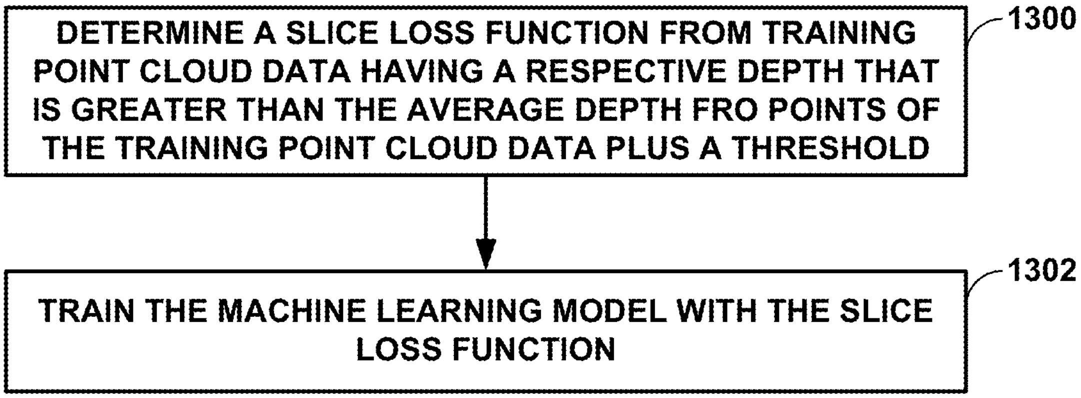
FIG. 13 is a flow diagram illustrating machine learning model training techniques according to one or more aspects of this disclosure.

FIG. 13 is a flow diagram illustrating machine learning model training techniques according to one or more aspects of this disclosure. While described with respect to vehicle 100, the machine learning model training techniques may be performed by one or more processors located within vehicle 100, outside of vehicle 100 (e.g., within a cloud computing environment), or a combination thereof.

Vehicle 100 may determine a slice loss function from training point cloud data having a respective depth that is greater than the average depth for points of the training point cloud data plus a threshold (1300). For example, vehicle 100 may determine slice loss function 232 based on points of training point cloud data associated with a neighboring vehicle that have a respective depth greater than the average depth for points of the training point cloud data associated with the neighboring vehicle plus a threshold. Vehicle 100 may train the machine learning model with the slice loss function (1302). For example, vehicle 100 may train depth model 204 with slicing loss function 232 to remove slicing errors in LiDAR data being used to train depth model 204.

In some examples, as part of training the machine learning model (e.g., depth model 204), vehicle 100 may image data from a monocular camera (e.g., camera 104). In some examples, vehicle 100 may further train the machine learning model with at least one of depth gradient loss function 182, depth supervision loss function 170, or photometric loss function 180.

In some examples, vehicle 100 may generate a 2D instance label based on one or more LiDAR annotations, the 2D instance label being associated with an instance of an object of the vehicle. Vehicle 100 may transform 3D points of the point cloud data to 2D points in a frame to generate the instance of the object. Vehicle 100 may determine boundary points of the instance of the object. Vehicle 100 may generate a mask based at least in part on the boundary points, the mask defining the set of points, the set of points being associated with the instance of the object. Vehicle 100 may determine the slice loss for points associated with the instance of the object having an associated depth that is greater than an average depth for points associated with the instance of the object plus a threshold.

In some examples, vehicle 100 may filter points within the instance of the object that are within a predetermined distance of LiDAR system 102 or vehicle 100 or vehicle 100 prior to determining the boundary points, such that only filtered points are used to determine the boundary points.

In some examples, as part of generating the 2D instance label based on one or more LiDAR annotations, vehicle 100 may generate a bounding box based on the one or more LiDAR annotations. In some examples, vehicle 100 may generate a transformation matrix based on camera intrinsics and extrinsics. Vehicle 100 may apply the transformation matrix to bounding box coordinates of the bounding box to generate corners of the bounding box. Vehicle 100 may determine, for each point in the point cloud if the point is inside the bounding box.

In some examples, as part of determining the boundary points for the instance of the object, vehicle 100 may apply a hull algorithm to points inside the bounding box. In some examples, the hull algorithm is a non-convex hull algorithm and uses an alpha value.

In some examples, vehicle 100 may apply a first predetermined alpha value to generate first boundary points. In some examples, vehicle 100 may determine whether the first boundary points meet a predetermined condition. In some examples, vehicle 100 may, based on the first boundary points not meeting the predetermined condition, apply a second predetermined alpha value to generate second boundary points, wherein the second boundary points comprise the boundary points.

In some examples, the first predetermined alpha value includes a value in the range of 0.1 and 0.2 inclusive. In some examples, the first predetermined alpha value is 0.157. In some examples, the second predetermined alpha value includes a value less than 0.1. In some examples, the second predetermined alpha value is 0.02.

In some examples, the one or more processors are further configured to remove one or more ground points from the bounding box. For example, the one or more processors may be configured to lift a lower boundary of the bounding box by a distance so as to remove the one or more ground points from the bounding box. In some examples, the distance is 0.2 meters. In some examples, the distance is based on a diameter of a wheel of a vehicle associated with the bounding box.

Examples in the various aspects of this disclosure may be used individually or in any combination.

This disclosure includes the following clauses.

Clause 1. A system for controlling operation of a vehicle comprising: memory configured to a depth map indicative of distance of one or more objects to the vehicle; and one or more processors communicatively coupled to the memory, the one or more processors being configured to: determine the depth map; and control operation of a vehicle based on the depth map, wherein the one or more processors are configured to determine the depth map based on executing a machine learning model, the machine learning model having been trained with a slice loss function determined from training point cloud data having a respective depth that is greater than the average depth for a set of points of the training point cloud data plus a threshold.

Clause 2. The system of clause 1, further comprising a monocular camera configured to sense image data, wherein the one or more processors are configured to determine the depth map based on executing the machine learning model on the image data.

Clause 3. The system of clause 1 or clause 2, wherein the machine learning model has been further trained with at least one of a depth gradient loss function, a depth supervision loss function, or a photometric loss function.

Clause 4. A system for training a machine learning model, the system comprising: memory configured to store the machine learning model; and one or more processors communicatively coupled to the memory, the one or more processors being configured to: determine a slice loss function from training point cloud data having a respective depth that is greater than the average depth for a set of points of the training point cloud data plus a threshold; and train the machine learning model with the slice loss function.

Clause 5. The system of clause 4, wherein as part of training the machine learning model, the one or more processors are configured to process image data from a monocular camera.

Clause 6. The system of clause 4 or clause 5, wherein the one or more processors are further configured train the machine learning model with at least one of a depth gradient loss function, a depth supervision loss function, or a photometric loss function.

Clause 7. The system of any of clauses 4-6, wherein as part of determining the slice loss function, the one or more processors are configured to: generate a two-dimensional (2D) instance label based on one or more LiDAR annotations, the 2D instance label being associated with an instance of an object of a neighboring vehicle; transform three-dimensional (3D) points of the training point cloud data to 2D points in a frame to generate the instance of the object; determine boundary points of the instance of the object; generate a mask based at least in part on the boundary points, the mask defining the set of points, the set of points being associated with the instance of the object; and determine the slice loss for points associated with the instance of the object having an associated depth that is greater than an average depth for the points associated with the instance of the object plus a threshold.

Clause 8. The device of clause 7, wherein the one or more processors are configured to filter points within the instance of the object that are within a predetermined distance of a LiDAR sensor of the vehicle or the vehicle prior to determining the boundary points to generate filtered points, wherein the one or more processors are configured to determine the slice loss based on the filtered points and no other points of the training point cloud data.

Clause 9. The device of clause 7 or clause 8, wherein as part of generating the 2D instance label based on one or more LiDAR annotations, the one or more processors are configured to generate a bounding box based on the one or more LiDAR annotations.

Clause 10. The system of clause 9, wherein as part of transforming 3D points of the point cloud data to 2D points in the frame, the one or more processors are configured to: generate a transformation matrix based on camera intrinsics and extrinsics; apply the transformation matrix to bounding box coordinates to generate corners of the bounding box; and determine, for each point in the point cloud if the point is inside the bounding box.

Clause 11. The system of clause 9 or clause 10, wherein as part of determining the boundary points for the instance of the object, the one or more processors are configured to apply a hull algorithm to the points inside the bounding box.

Clause 12. The system of clause 11, wherein the hull algorithm is a non-convex hull algorithm, and wherein the non-convex hull algorithm uses an alpha value.

Clause 13. The system of clause 12, wherein the one or more processors are configured to: apply a first predetermined alpha value to generate first boundary points; determine whether the first boundary points meet a predetermined condition; and based on the first boundary points not meeting the predetermined condition, apply a second predetermined alpha value to generate second boundary points, wherein the second boundary points comprise the boundary points.

Clause 14. The system of clause 13, wherein the first predetermined alpha value comprises a value in the range of 0.1 and 0.2 inclusive.

Clause 15. The system of clause 14, wherein the first predetermined alpha value is 0.157.

Clause 16. The system of any of clauses 13-15, wherein the second predetermined alpha value comprises a value less than 0.1.

Clause 17. The system of clause 16, wherein the second predetermined alpha value is 0.02.

Clause 18. The system of any of clauses 9-17, wherein the one or more processors are further configured remove one or more ground points from the bounding box, wherein to remove the one or more ground points, the one or more processors are configured to lift a lower boundary of the bounding box by a distance.

Clause 19. The system of clause 18, wherein the distance is at least one of 0.2 meters or based on a diameter of a wheel of the neighboring vehicle associated with the bounding box.

Clause 20. A method for controlling operation of a vehicle, the method comprising: determining a depth map indicative of the distance to the vehicle; and controlling operation of a vehicle based on the depth map, wherein determining the depth map comprises executing a machine learning model, the machine learning model having been trained with a slice loss function determined from training point cloud data having a respective depth that is greater than the average depth for a set of points of the training point cloud data plus a threshold.

Clause 21. The method of clause 20, wherein determining the depth map is based on image data from a monocular camera.

Clause 22. The method of clause 20 or clause 21, wherein the machine learning model has been further trained with at least one of a depth gradient loss function, a depth supervision loss function, or a photometric loss function.

Clause 23. A method for training a machine learning model, the method comprising: determining a slice loss function from training point cloud data having a respective depth that is greater than the average depth for a set of points of the training point cloud data plus a threshold; and training the machine learning model with the slice loss function.

Clause 24. The method of clause 23, wherein training the machine learning model comprises processing image data from a monocular camera.

Clause 25. The method of clause 23 or clause 24, further comprising training the machine learning model with at least one of a depth gradient loss function, a depth supervision loss function, or a photometric loss function.

Clause 26. The method of any of clauses 23-25, wherein determining the slice loss function comprises: generating a two-dimensional (2D) instance label based on one or more LiDAR annotations, the 2D instance label being associated with an instance of an object of a neighboring vehicle; transforming three-dimensional (3D) points of the training point cloud data to 2D points in a frame to generate the instance of the object; determining boundary points of the instance of the object; generating a mask based at least in part on the boundary points, the mask defining the set of points, the set of points being associated with the instance of the object; and determining the slice loss the for points associated with the instance of the object having an associated depth that is greater than an average depth for points associated with the instance of the object plus a threshold.

Clause 27. The method of clause 26, further comprising filtering points within the instance of the object that are within a predetermined distance of a LiDAR sensor of a vehicle or the vehicle prior to determining the boundary points to generate filtered points, wherein determining the slice loss is based on the filtered points and no other points of the training point cloud data.

Clause 28. The method of clause 26 or clause 27, wherein generating the 2D instance label based on one or more LiDAR annotations comprises generating a bounding box based on the one or more LiDAR annotations.

Clause 29. The method of clause 28, wherein transforming 3D points of the point cloud data to 2D points in a frame comprises: generating a transformation matrix based on camera intrinsics and extrinsics; applying the transformation matrix to bounding box coordinates of the bounding box to generate corners of the bounding box; and determining, for each point in the point cloud if the point is inside the bounding box.

Clause 30. The method of any of clauses 26-29, wherein determining the boundary points for the instance of the object comprises applying a hull algorithm to the points inside the bounding box.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A system for controlling operation of a vehicle comprising:

memory configured to store a depth map indicative of distance of one or more objects to the vehicle; and one or more processors communicatively coupled to the memory, the one or more processors being configured to:

determine the depth map; and control operation of the vehicle based on the depth map, wherein the one or more processors are configured to determine the depth map based on executing a machine learning model, the machine learning model having been trained with a slice loss function used to reduce effects of incorrect depth data due to light from a LiDAR system passing through one or more transparent surfaces, the slice loss function determined from training point cloud data having a respective depth that is greater than the average depth for a set of points of the training point cloud data plus a threshold wherein the machine learning model has been further trained with at least one of a depth gradient loss function, a depth supervision loss function, or a photometric loss function.

2. The system of claim 1, further comprising a monocular camera configured to sense image data, wherein the one or more processors are configured to determine the depth map based on executing the machine learning model on the image data.

3. A system for training a machine learning model, the system comprising:

memory configured to store the machine learning model; and one or more processors communicatively coupled to the memory, the one or more processors being configured to:

determine a slice loss function from training point cloud data having a respective depth that is greater than the average depth for a set of points of the training point cloud data plus a threshold; and train the machine learning model with the slice loss function used to reduce effects of incorrect depth data due to light from a LiDAR system passing through one or more transparent surfaces to generate a trained machine learning model, the trained machine learning model being configured to determine a depth map used to control operation of a vehicle wherein the one or more processors are further configured train the machine learning model with at least one of a depth gradient loss function, a depth supervision loss function, or a photometric loss function.

4. The system of claim 3, wherein as part of training the machine learning model, the one or more processors are configured to process image data from a monocular camera.

5. The system of claim 3, wherein as part of determining the slice loss function, the one or more processors are configured to:

generate a two-dimensional (2D) instance label based on one or more LiDAR annotations, the 2D instance label being associated with an instance of an object of a neighboring vehicle;

transform three-dimensional (3D) points of the training point cloud data to 2D points in a frame to generate the instance of the object;

determine boundary points of the instance of the object;

generate a mask based at least in part on the boundary points, the mask defining the set of points, the set of points being associated with the instance of the object; and determine the slice loss for points associated with the instance of the object having an associated depth that is greater than an average depth for the points associated with the instance of the object plus a threshold.

6. The system of claim 5, wherein the one or more processors are configured to filter points within the instance of the object that are within a predetermined distance of a LiDAR sensor of the vehicle or the vehicle prior to determining the boundary points to generate filtered points, wherein the one or more processors are configured to determine the slice loss based on the filtered points and no other points of the training point cloud data.

7. The system of claim 5, wherein as part of generating the 2D instance label based on one or more LiDAR annotations, the one or more processors are configured to generate a bounding box based on the one or more LiDAR annotations.

8. The system of claim 7, wherein as part of transforming 3D points of the point cloud data to 2D points in the frame, the one or more processors are configured to:

generate a transformation matrix based on camera intrinsics and extrinsics;

apply the transformation matrix to bounding box coordinates to generate corners of the bounding box; and determine, for each point in the point cloud if the point is inside the bounding box.

9. The system of claim 7, wherein as part of determining the boundary points for the instance of the object, the one or more processors are configured to apply a hull algorithm to the points inside the bounding box.

10. The system of claim 9, wherein the hull algorithm is a non-convex hull algorithm, and wherein the non-convex hull algorithm uses an alpha value.

11. The system of claim 10, wherein the one or more processors are configured to:

apply a first predetermined alpha value to generate first boundary points;

determine whether the first boundary points meet a predetermined condition; and based on the first boundary points not meeting the predetermined condition, apply a second predetermined alpha value to generate second boundary points, wherein the second boundary points comprise the boundary points.

12. The system of claim 11, wherein the first predetermined alpha value comprises a value in the range of 0.1 and 0.2 inclusive.

13. The system of claim 12, wherein the first predetermined alpha value is 0.157.

14. The system of claim 11, wherein the second predetermined alpha value comprises a value less than 0.1.

15. The system of claim 14, wherein the second predetermined alpha value is 0.02.

16. The system of claim 7, wherein the one or more processors are further configured remove one or more ground points from the bounding box, wherein to remove the one or more ground points, the one or more processors are configured to lift a lower boundary of the bounding box by a distance.

17. The system of claim 16, wherein the distance is at least one of 0.2 meters or based on a diameter of a wheel of the neighboring vehicle associated with the bounding box.

18. A method for controlling operation of a vehicle, the method comprising:

determining a depth map indicative of the distance to the vehicle; and controlling operation of the vehicle based on the depth map, wherein determining the depth map comprises executing a machine learning model, the machine learning model having been trained with a slice loss function used to reduce effects of incorrect depth data due to light from a LiDAR system passing through one or more transparent surfaces, the slice loss function determined from training point cloud data having a respective depth that is greater than the average depth for a set of points of the training point cloud data plus a threshold wherein the machine learning model has been further trained with at least one of a depth gradient loss function, a depth supervision loss function, or a photometric loss function.

19. The method of claim 18, wherein determining the depth map is based on image data from a monocular camera.

20. A method for training a machine learning model, the method comprising:

determining a slice loss function from training point cloud data having a respective depth that is greater than the average depth for a set of points of the training point cloud data plus a threshold; and training the machine learning model with the slice loss function used to reduce effects of incorrect depth data due to light from a LiDAR system passing through one or more transparent surfaces to generate a trained machine learning model, the trained machine learning model being configured to determine a depth map used to control operation of a vehicle wherein training the machine learning model further comprises training the machine learning model with at least one of a depth gradient loss function, a depth supervision loss function, or a photometric loss function.

21. The method of claim 20, wherein training the machine learning model comprises processing image data from a monocular camera.

22. The method of claim 20, wherein determining the slice loss function comprises:

generating a two-dimensional (2D) instance label based on one or more LiDAR annotations, the 2D instance label being associated with an instance of an object of a neighboring vehicle;

transforming three-dimensional (3D) points of the training point cloud data to 2D points in a frame to generate the instance of the object;

determining boundary points of the instance of the object;

generating a mask based at least in part on the boundary points, the mask defining the set of points, the set of points being associated with the instance of the object; and determining the slice loss for points associated with the instance of the object having an associated depth that is greater than an average depth for the points associated with the instance of the object plus a threshold.

23. The method of claim 22, further comprising filtering points within the instance of the object that are within a predetermined distance of a LiDAR sensor of a vehicle or the vehicle prior to determining the boundary points to generate filtered points, wherein determining the slice loss is based on the filtered points and no other points of the training point cloud data.

24. The method of claim 22, wherein generating the 2D instance label based on one or more LiDAR annotations comprises generating a bounding box based on the one or more LiDAR annotations.

25. The method of claim 24, wherein transforming 3D points of the point cloud data to 2D points in a frame comprises:

generating a transformation matrix based on camera intrinsics and extrinsics;

applying the transformation matrix to bounding box coordinates of the bounding box to generate corners of the bounding; and determining, for each point in the point cloud if the point is inside the bounding box.

26. The method of claim 22, wherein determining the boundary points for the instance of the object comprises applying a hull algorithm to the points inside the bounding box.

* * * * *